US012420292B2

(12) United States Patent
Lev

(10) Patent No.: US 12,420,292 B2
(45) Date of Patent: *Sep. 23, 2025

(54) SHOWERHEAD WITH REMOVABLE PORTION

(71) Applicant: Mordechai Lev, Bloomfield Hills, MI (US)

(72) Inventor: Mordechai Lev, Bloomfield Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/228,152

(22) Filed: Jul. 31, 2023

(65) Prior Publication Data

US 2023/0372952 A1 Nov. 23, 2023

Related U.S. Application Data

(63) Continuation of application No. 17/131,923, filed on Dec. 23, 2020, now Pat. No. 11,759,800.

(51) Int. Cl.
*E03C 1/04* (2006.01)
*B05B 1/18* (2006.01)
*E03C 1/02* (2006.01)

(52) U.S. Cl.
CPC .............. *B05B 1/185* (2013.01); *E03C 1/025* (2013.01); *E03C 1/0409* (2013.01)

(58) Field of Classification Search
CPC ..... B05B 1/185; B05B 1/3026; B05B 1/1636; E03C 1/025; E03C 1/0409; E03C 1/0408
See application file for complete search history.

(56) References Cited

U.S. PATENT DOCUMENTS 7,900,295 B2 * 3/2011 Lev ......................... B05B 15/62 4/615
9,438,977 B2 9/2016 Wang et al.
9,828,752 B2 11/2017 Genord et al.
9,919,331 B2 3/2018 Scheffer et al.
10,017,923 B2 7/2018 Genord et al.
10,046,341 B2 8/2018 Wu et al.
10,533,309 B2 1/2020 Genord et al.
10,661,284 B2 5/2020 Lin et al.
10,821,449 B2 11/2020 Lin et al.
11,400,462 B2 8/2022 L'Henaff et al.
2018/0104707 A1 4/2018 Lin et al.
2018/0193851 A1 * 7/2018 L'Henaff .................. B05B 1/18
2021/0060598 A1 3/2021 Lee
2021/0178410 A1 6/2021 Davies et al.
2022/0331819 A1 10/2022 L'Henaff et al.
2023/0079771 A1 3/2023 Spangler et al.

* cited by examiner

*Primary Examiner* — Qingzhang Zhou
(74) *Attorney, Agent, or Firm* — MaxGoLaw PLLC

(57) ABSTRACT

A showerhead with a removable portion is provided that includes a fixed fluid dispensing unit supported at a location. The fixed dispensing unit has a fixed nozzle apertures arranged on a fixed spray face within a first area of between 55 and 95 percent of the fixed spray face, the fixed spray face having a second area devoid of fixed nozzle apertures and contiguous with the first area. A removable fluid dispensing unit has a front face defining a front face area, a back surface in opposition to the front face, and removable nozzle apertures arranged on the front face, the back surface adapted to overlap the second area of the fixed spray face and protrude in every portion from the fixed spray face. A handle and fluid supply house are provided.

19 Claims, 20 Drawing Sheets

SHOWERHEAD WITH REMOVABLE PORTION

RELATED APPLICATIONS

This application is a continuation of U.S. application Ser. No. 17/131,923, filed Dec. 23, 2020; the contents of which are hereby incorporated by reference.

FIELD OF THE INVENTION

The present invention generally relates to showerheads; and more specifically, the present invention relates to a showerhead incorporating a super complementary detachable spray head with a handle and a diverter control interface for directing fluid flow.

BACKGROUND OF THE INVENTION

The prior art is well documented with various examples of showerhead attachments and assemblies. In each instance, such showerhead devices provide either or both of a steady stream flow or pulse flow of water to a user, and such as within a shower or tub enclosure. In certain instances, the assembly may be subdivided into more than one water dispensing head, such often including a fixed showerhead and a movable showerhead fluidly related in some fashion to the fixed showerhead.

A first example drawn from the prior art is set forth in U.S. Pat. No. 4,752,975, issued to Yates, and which teaches a showerhead assembly including a diverter valve for diverting a water supply to one of two showerheads. One of the showerheads is generally laterally and adjustably displaced from the other of the showerheads by means of a swivelable extension arm and the entire assembly is easily installable on the existing overhead water supply line of a shower stall or bath enclosure.

U.S. Pat. No. 5,749,552, issued to Fan, teaches a mounting assembly for mounting a bracket for attaching a handheld showerhead in relation to a wall of a bathroom. The mounting assembly includes a fitting having an end for connecting with a fixed spray head, another end for connecting a water supply pipe and an extending portion for threadably engaging a top end of a post on which the bracket can be slidably locked therealong. A bottom end of the post is attached with a vacuum mounting assembly for mounting the bottom end of the post on the wall by a vacuum pressure.

U.S. Pat. No. 3,471,872, issued to Symmons, teaches a plumbing fixture for baths which facilitates provision of a handheld spray unit in a bathtub or shower installation. A casing incorporates a diverter valve assembly and an ornamental housing which conceals the casing and is adapted to function as a tub spout or as a showerhead support.

U.S. Pat. No. 7,360,723, issued to Lev, teaches a showerhead system having a fixed fluid dispending unit, a removable fluid dispensing unit that is releasably secured to a receptacle established within a fixed dispensing unit, and a fluid diverter element located at an inlet of the fixed unit to provide selective communication of a fluid supply with either or both the fixed and removable fluid dispensing units. Notably, when the removable fluid dispending unit is secured to the receptacle within the fixed dispensing unit, the removable dispensing unit and the fixed dispensing unit form an integral spray face.

U.S. Pat. No. 7,665,676, issued to Lev, teaches a showerhead system having a fixed fluid dispending unit, a removable fluid dispensing unit that is releasably secured to a receptacle established within the fixed dispensing unit, and a fluid diverter element located at an inlet of the fixed unit to provide selective communication of a fluid supply with either or both the fixed and removable fluid dispensing units. The receptacle within the fixed dispensing unit is defined by a recessed side and a base recessed surface. The removable fluid dispending unit includes a head that tapers to a handle, that engages with the base recessed surface of the receptacle established within the fixed dispensing unit, and that has a side of the head that is complementary to the recessed side of the fixed fluid dispensing unit.

U.S. Pat. No. 10,533,309, issued to Genord et al., teaches a shower assembly that includes a base having a base front face defining a recess and a moveable shower having a head portion and a handle extending from the head portion along a vertical axis. The head portion has a head front face with a first plurality of spray apertures and a rear portion receivable within the recess of the base such that the head front face protrudes outwardly of the base front face. A portion of the handle is received in a grip within the base. A magnet holds the moveable shower relative to the base.

U.S. Pat. No. 9,828,752, issued to Genord et al., teaches a shower assembly that includes a handheld shower having a handle extending from a moveable spray head. The handheld shower removably docks within a recessed area of a fixed spray head base. A water supply provides water to the moveable spray head and the fixed spray head. The fixed spray head includes a cover portion and a spray portion. A magnet is positioned in a recess in the fixed spray head between the spray portion and the cover portion of the fixed spray head. The magnet attracts a plate of the handheld shower toward the fixed spray head to hold the handheld shower within the recessed area of the fixed spray head.

Finally, U.S. Pat. No. 10,017,923, issued to Genord et al., teaches a shower assembly that includes a handheld shower having a handle extending from a moveable spray head. The handheld shower removably docks within a recessed area of a base. A water supply provides water to the moveable spray head and the fixed spray head. A magnet and a member associated with the base and the moveable spray head, respectively, attract one another and hold the moveable spray head relative to the base. A slot associated with the base receives a portion of the handle of the handheld shower.

In spite of the prior art efforts, there remains a need for a showerhead incorporating a detachable handle and spray head with a diverter control interface for directing fluid flow that is easy to use and reach especially for elderly, shorter people, and children. There further remains a need for such a showerhead that provides greater water coverage and therefore improved user experience than is currently available from existing showerheads while not exceeding limitations regarding allowable gallons per minute set by regulations. Such a showerhead would provide flexibility in the water stream characteristics and the shower experience as well as providing streamlined aesthetically pleasing design and easy installation, maintenance, and cleaning.

SUMMARY OF THE INVENTION

A showerhead with a super complementary removable portion is provided that includes a fixed fluid dispensing unit supported at a location. The fixed dispensing unit has a fixed nozzle apertures arranged on a fixed spray face within a first area of between 55 and 95 percent of the fixed spray face, the fixed spray face having a second area devoid of fixed nozzle apertures and contiguous with the first area. A removable fluid dispensing unit has a front face defining a front face area, a back surface in opposition to the front face, and removable nozzle apertures arranged on the front face, the back surface adapted to overlap the second area of the fixed spray face and protrude from the fixed spray face, the front face area being greater than the second area of the fixed spray face. A handle extends from the removable fluid dispensing unit. A hose in fluid communication with a fluid supply is adapted to being in selective communication with at least one of the fixed or removable fluid dispensing unit via a front mounted diverter interface.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1A:
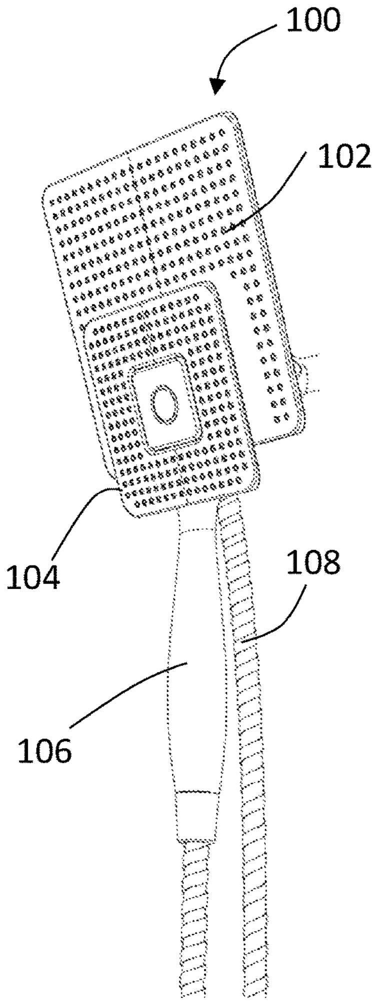
FIGS. 1A-1C respectively show front perspective, side perspective, and rear perspective views of a showerhead system according to embodiments of the present disclosure.
Figure 1B:
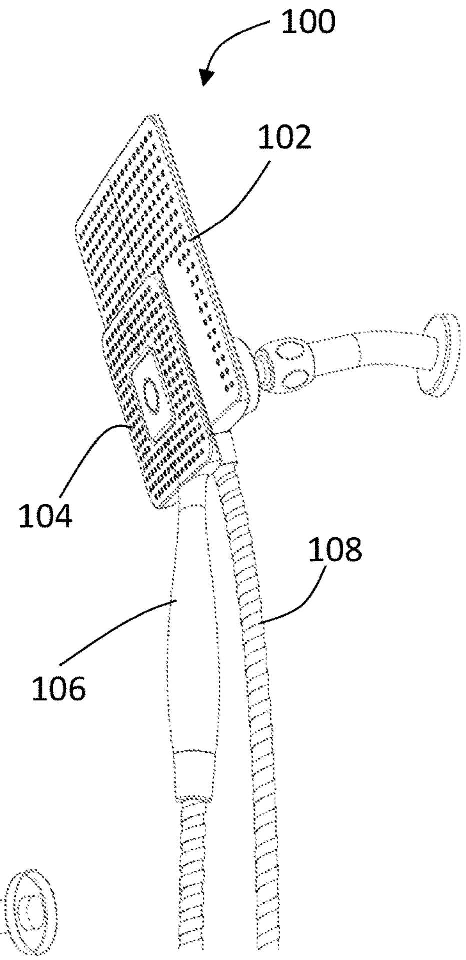
Figure 1C:
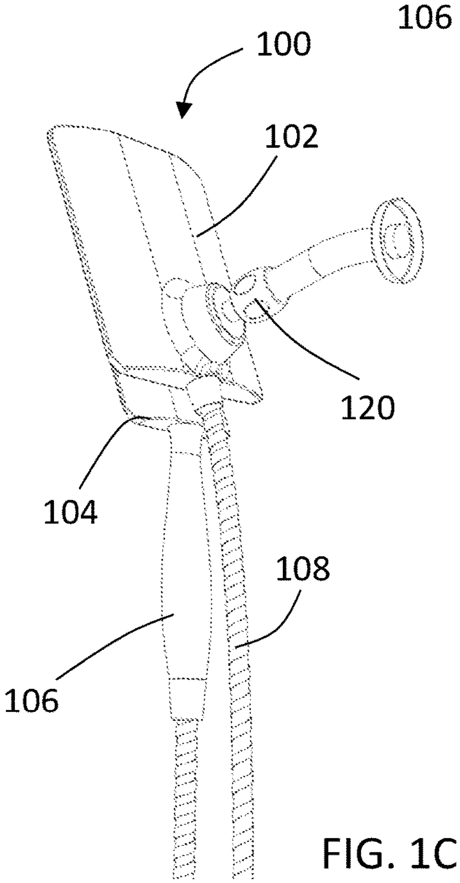
Figure 2A:
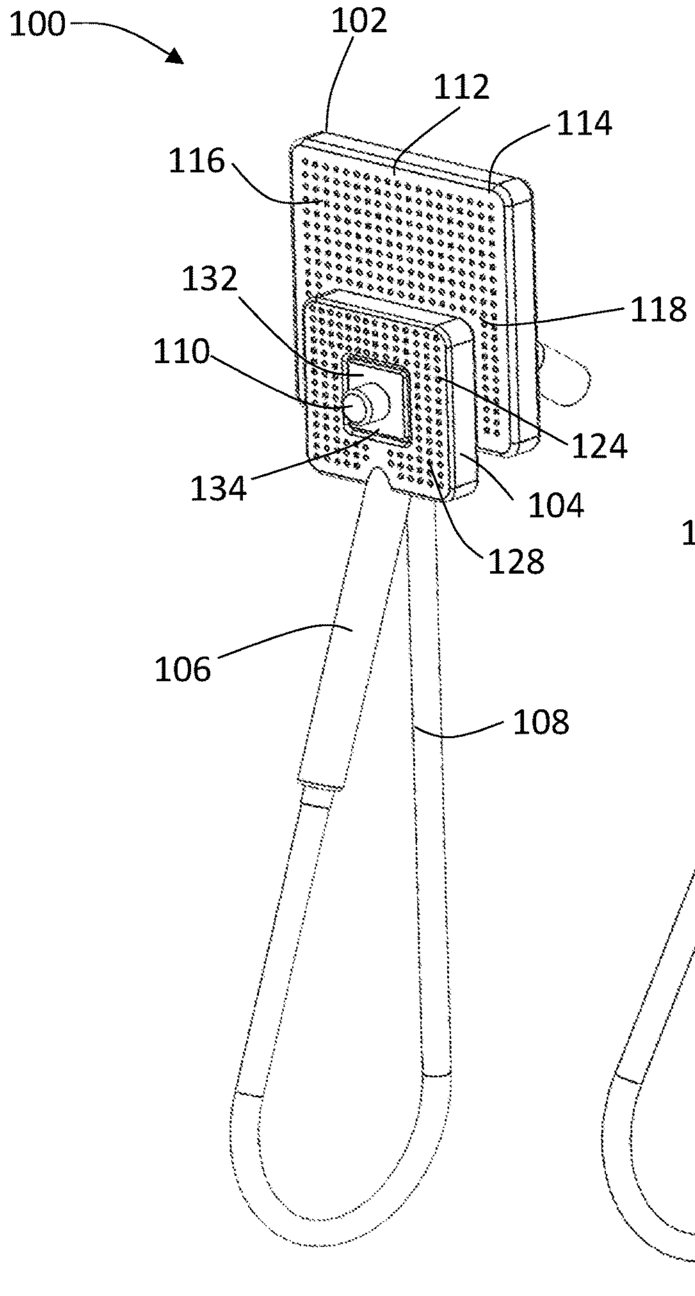
FIGS. 2A and 2B respectively show front perspective and rear perspective views of a showerhead system according to embodiments of the present disclosure.
Figure 2B:
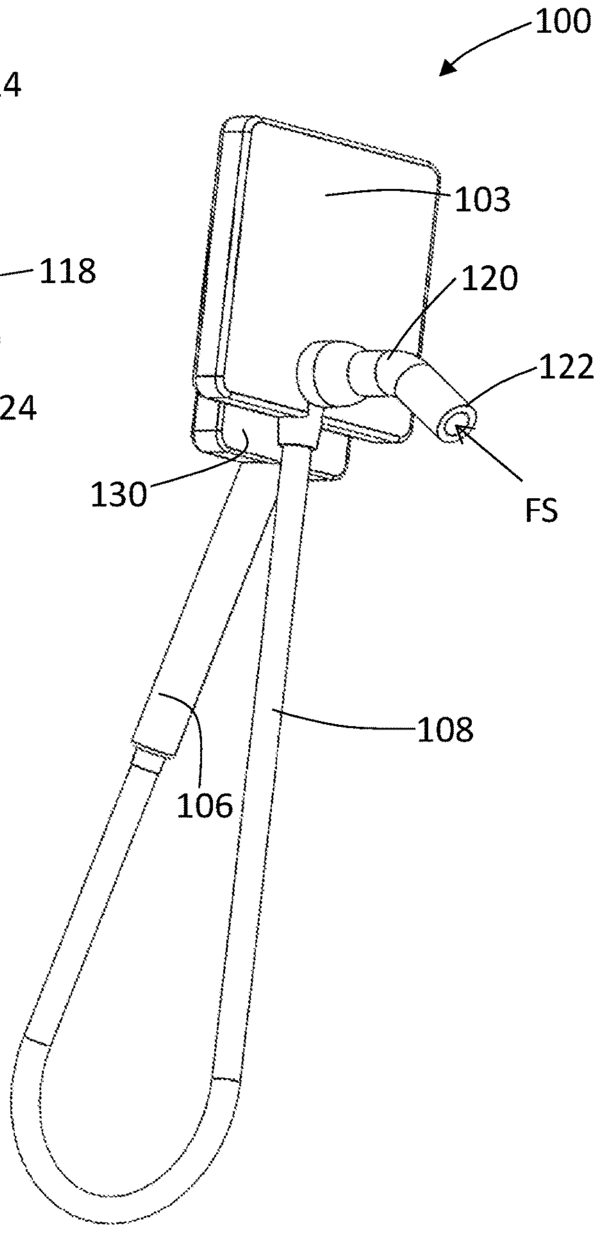
Figure 3A:
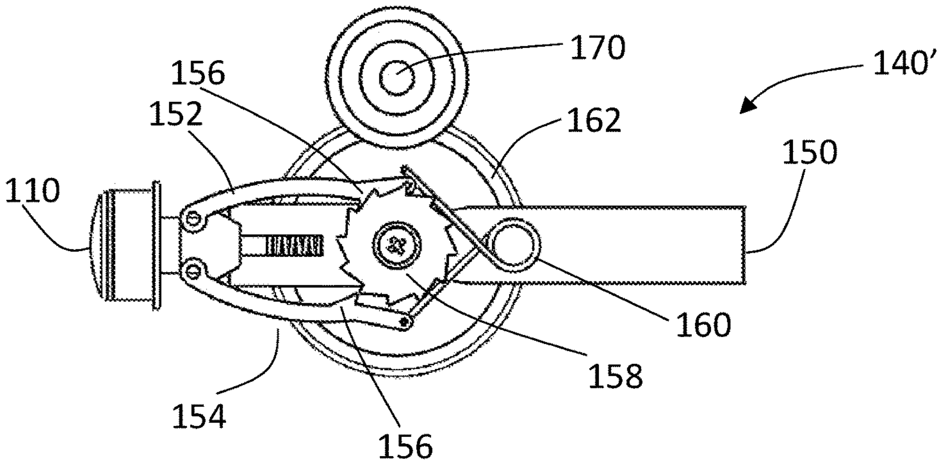
FIGS. 3A-3C respectively show bottom, top perspective, and bottom perspective views of a fluid diverter according to embodiments of the present disclosure.
Figure 3B:
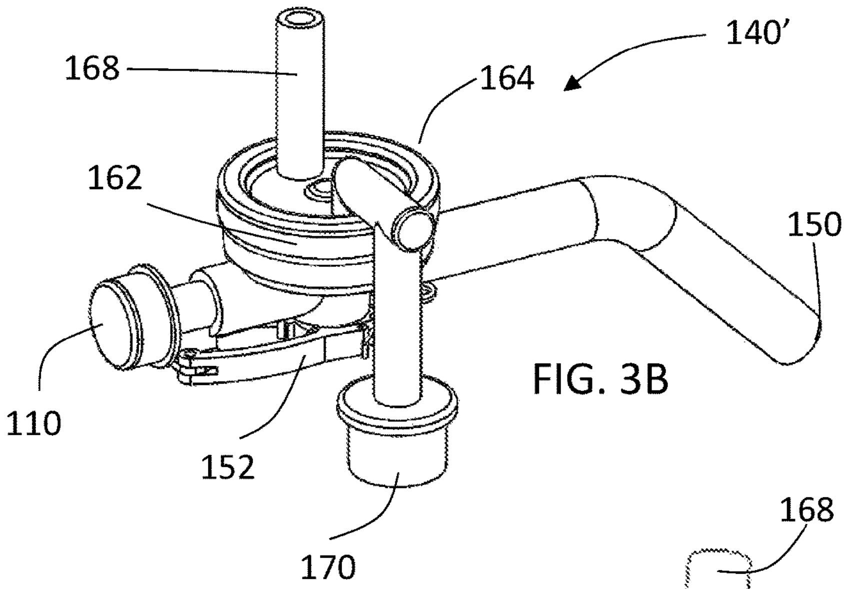
Figure 3C:
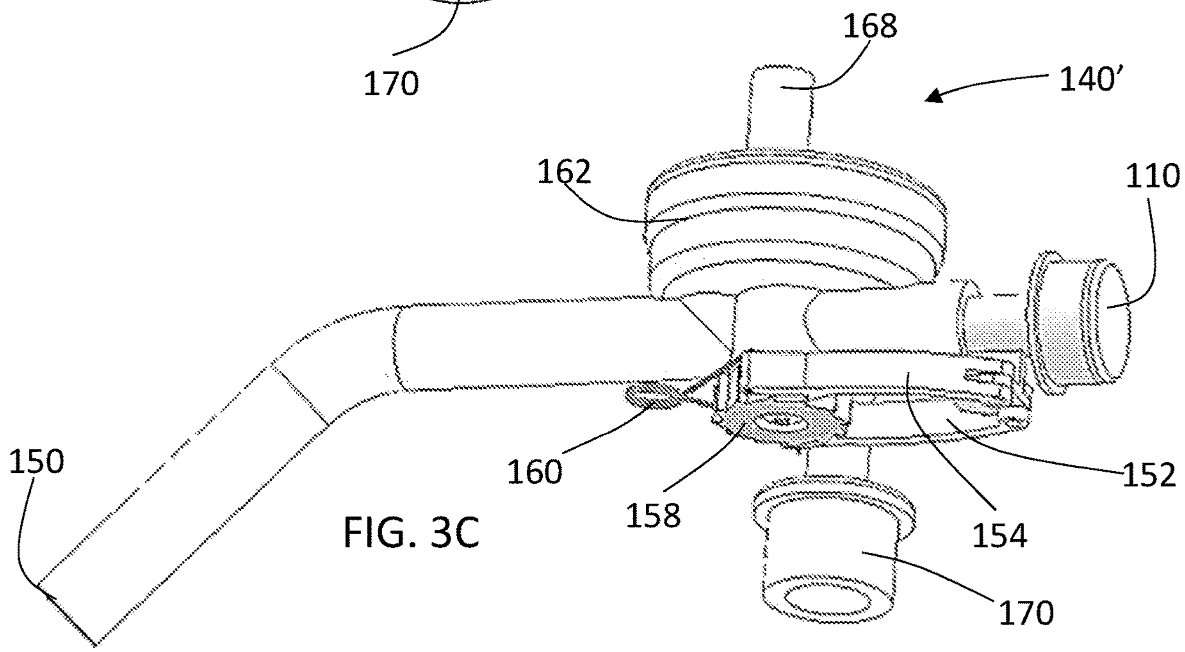
Figure 3D:
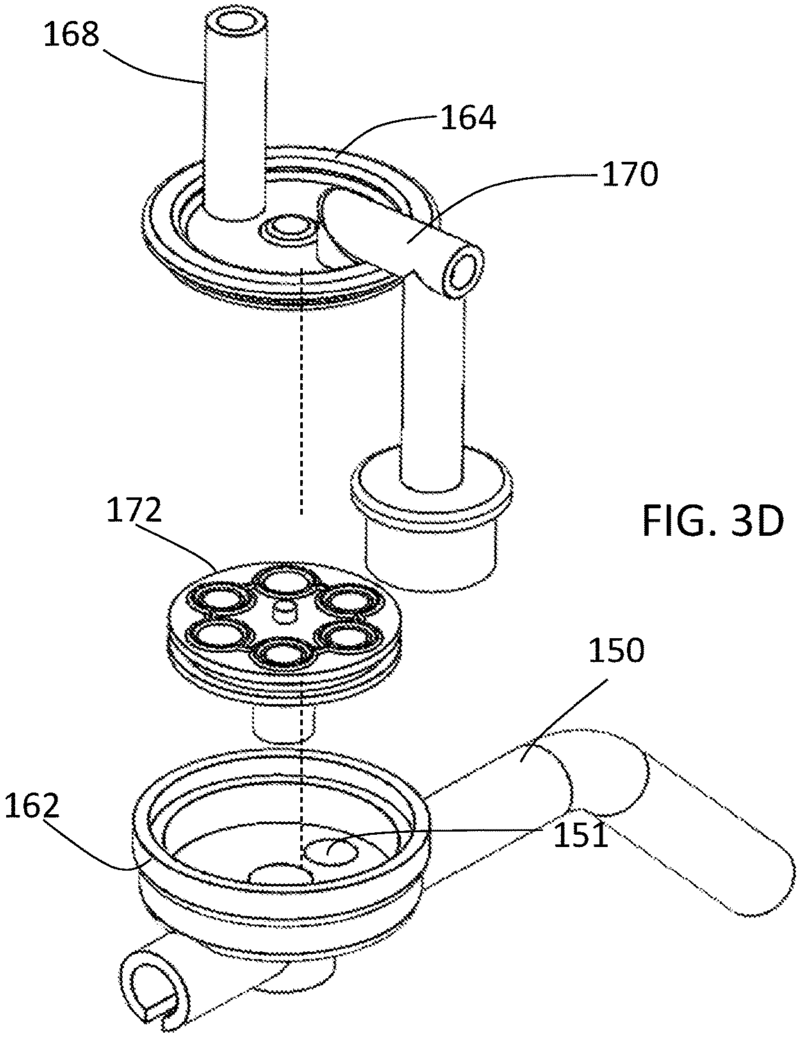
FIG. 3D is an exploded perspective view of a portion of the fluid diverter of FIGS. 3A-3C.
Figure 3E:
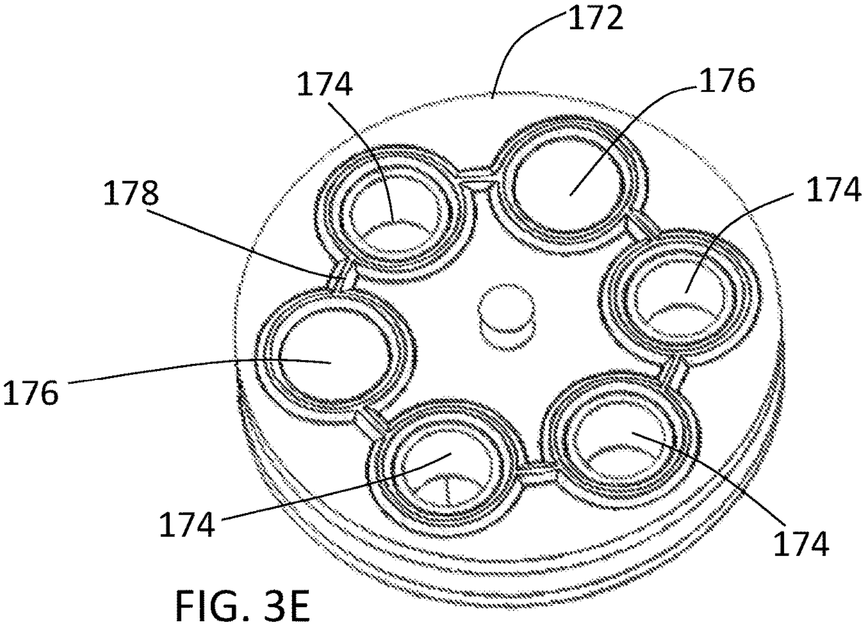
FIG. 3E is a perspective view of a selector plate of the fluid diverter of FIGS. 3A-3C.
Figure 3F:
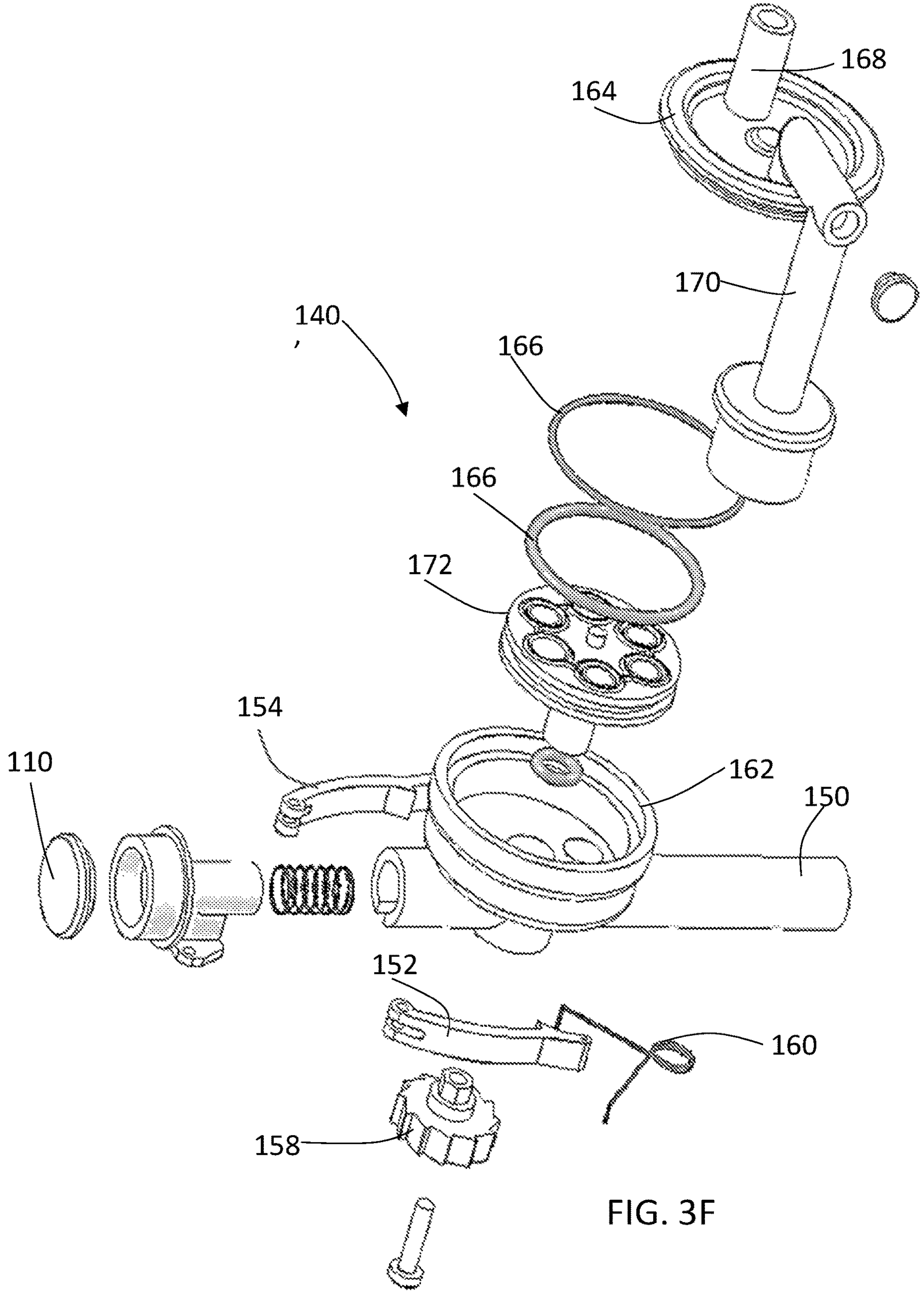
FIG. 3F is an exploded perspective view of the fluid diverter of FIGS. 3A-3C.

The present invention has utility as a hygienic shower fixture incorporating a detachable handle and spray head with a diverter control interface for directing fluid flow. The inventive showerhead further provides utility in that it is easy to use and reach especially for elderly, shorter people, and children. Additionally, the showerhead that provides greater water coverage and therefore improved user experience than is currently available from existing showerheads while not exceeding limitations regarding allowable gallons per minute set by regulations. The showerhead provides flexibility in the water stream characteristics and the shower experience as well as providing streamlined aesthetically pleasing design and easy installation, maintenance, and cleaning. The present invention provides the user with a traditional showerhead experience, in addition to the option of removing and manipulating a removable fluid dispensing unit incorporated into the showerhead. According to the present invention, and as will be further described, the removable fluid dispensing device optionally functions independently from the fixed fluid dispensing device as a water outlet, or in combination therewith, in an assembled position and dissociated position, respectively.

While the present invention is further detailed with respect to the cumulative nozzle opening area allocated between a fixed dispensing unit and a removable unit that is mates to the fixed dispensing unit in a super imposed fashion such that the removable unit extends beyond the face of the fixed dispensing unit. It is appreciated that in those instances where all the nozzles have the same cross-sectional area and are uniformly spaced, that that the face areas of the fixed and dispensing units correspond to the nozzle area ratio therebetween.

Referring now to the figures, embodiments of an inventive showerhead system 100 generally include a fixed fluid dispending unit 102, a removable fluid dispensing unit 104 configured to removably engage with the fixed fluid dispensing unit 102, a handle 106 extending from the removable fluid dispensing unit 104, and a hose 108 in fluid communication with a fluid supply FS adapted to being in selective communication with at least one of the fixed fluid dispensing unit 102 and the removable fluid dispensing unit 104 via a front mounted diverter interface 110.

Figure 4A:
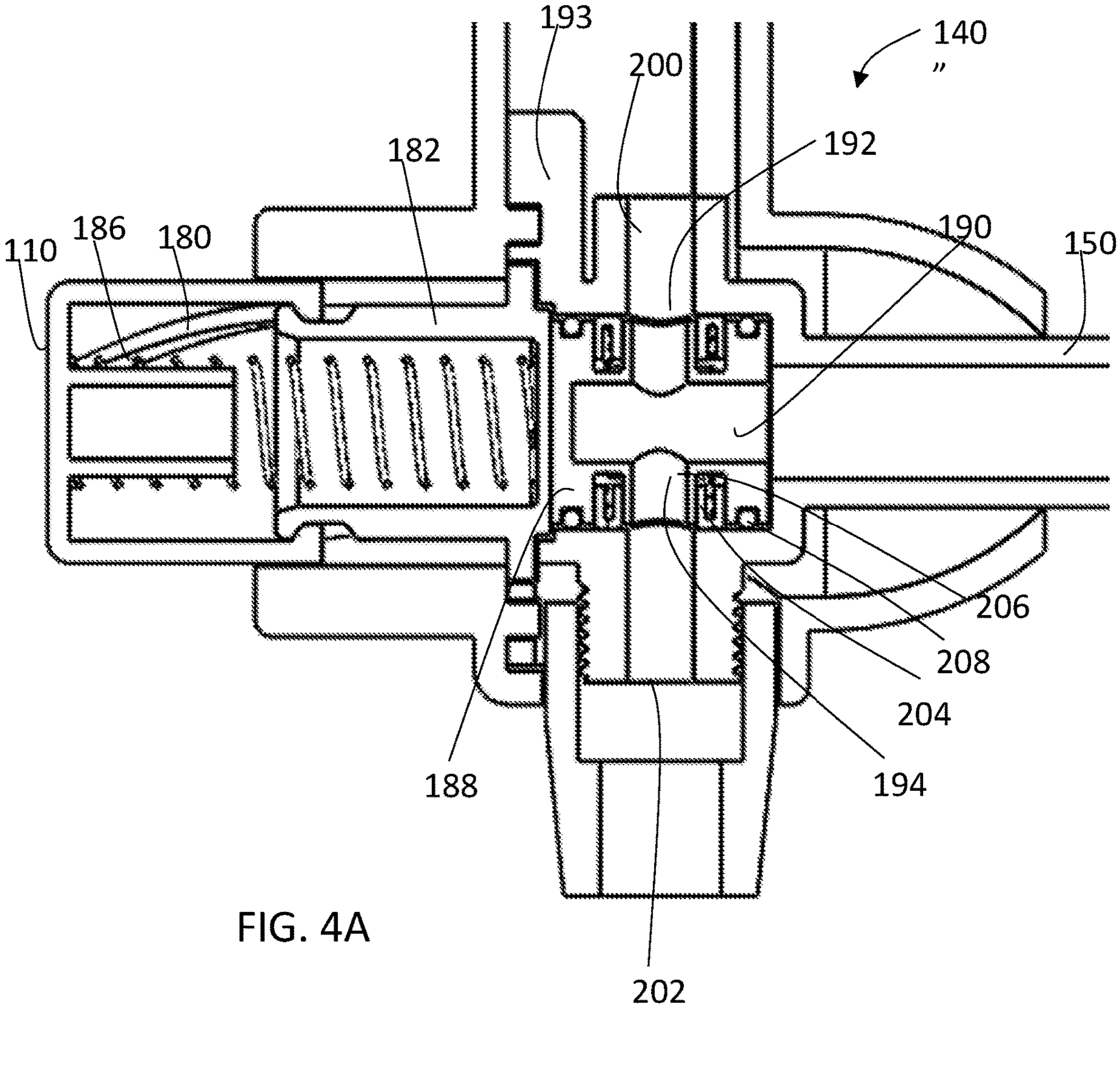
FIG. 4A is a cross-sectional view of a fluid diverter according to embodiments of the present disclosure.
Figure 4B:
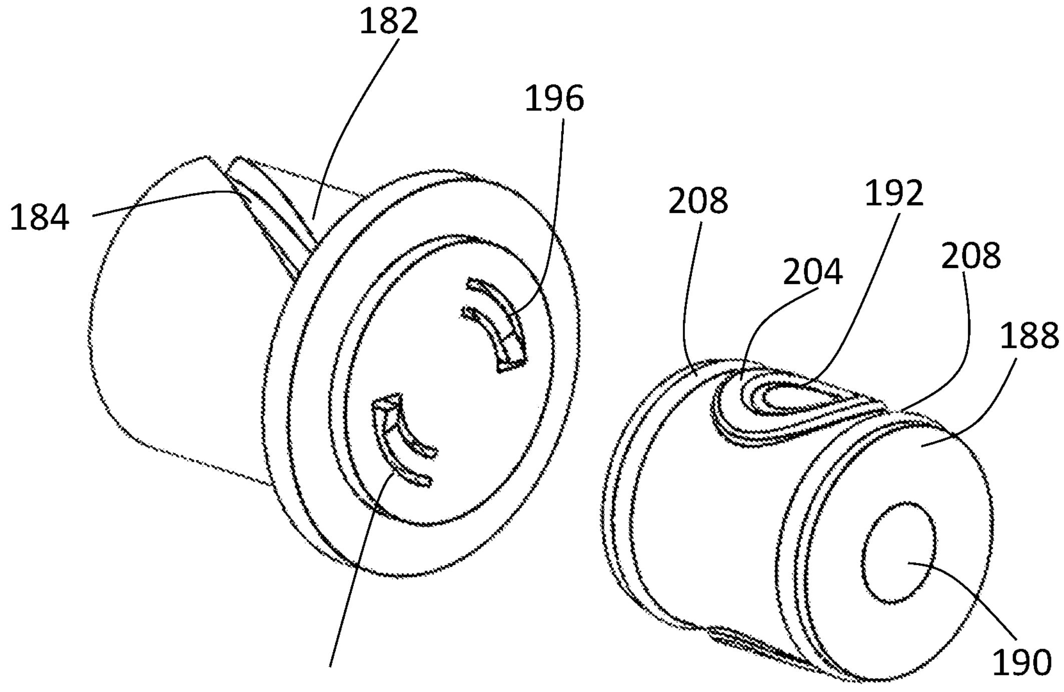
FIGS. 4B and 4C are detailed view of a drum and a diverter core of the fluid diverter of FIG. 4A.
Figure 4C:
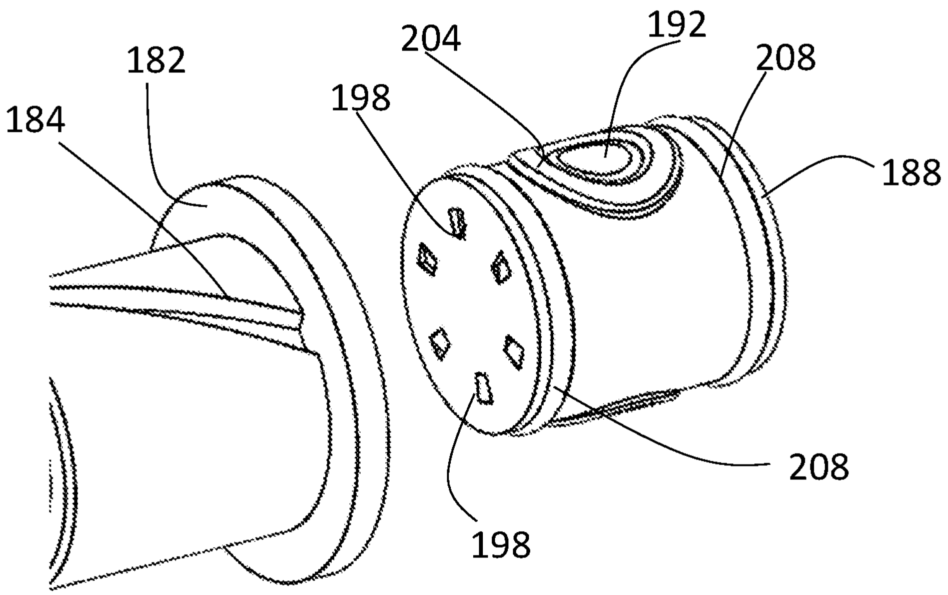
Figure 4D:
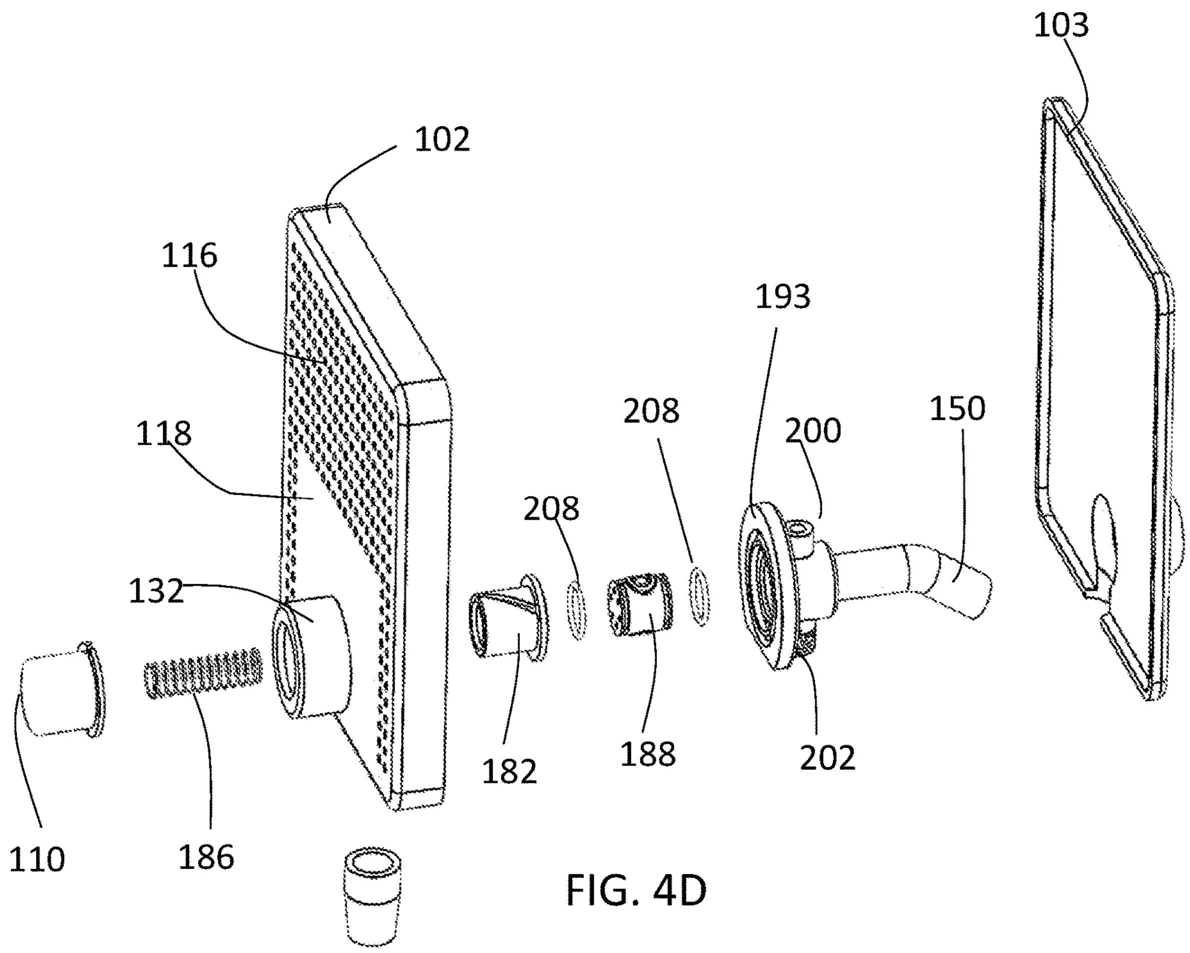
FIG. 4D is an exploded view of a fixed fluid dispensing unit according to embodiments of the present disclosure containing the fluid diverter of FIG. 4A.
Figure 5A:
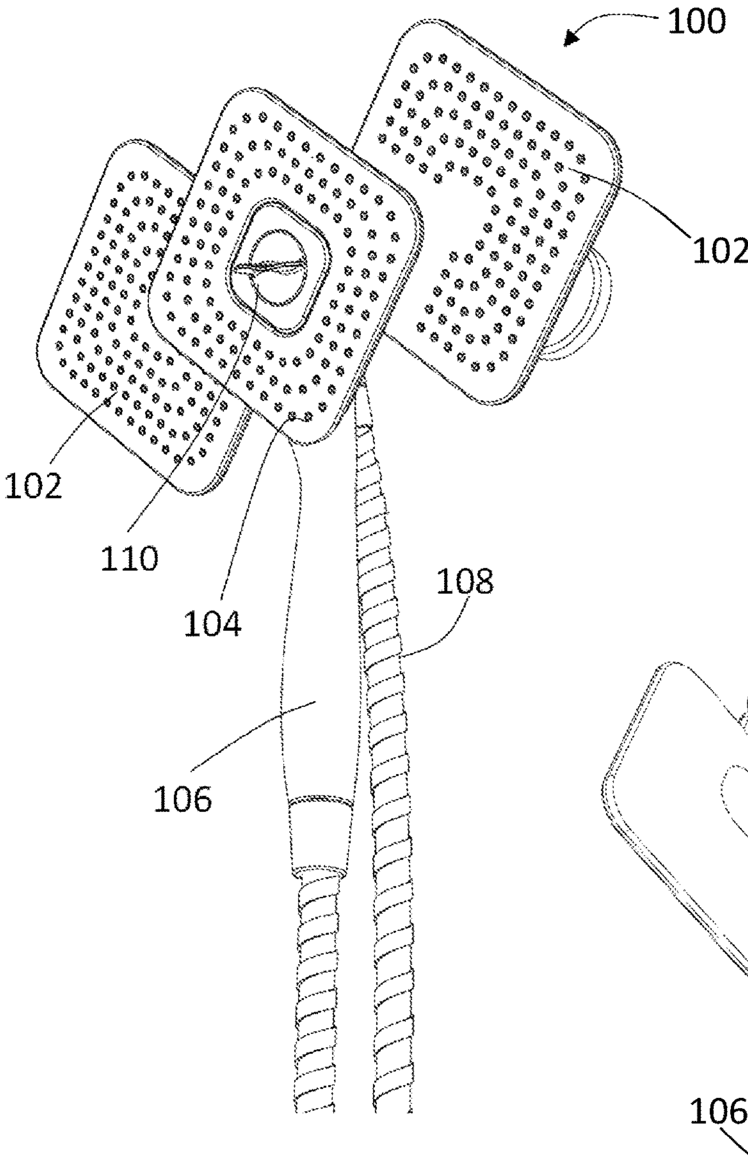
FIGS. 5A and 5B respectively show front perspective and rear perspective views of a showerhead system according to embodiments of the present disclosure.
Figure 5B:
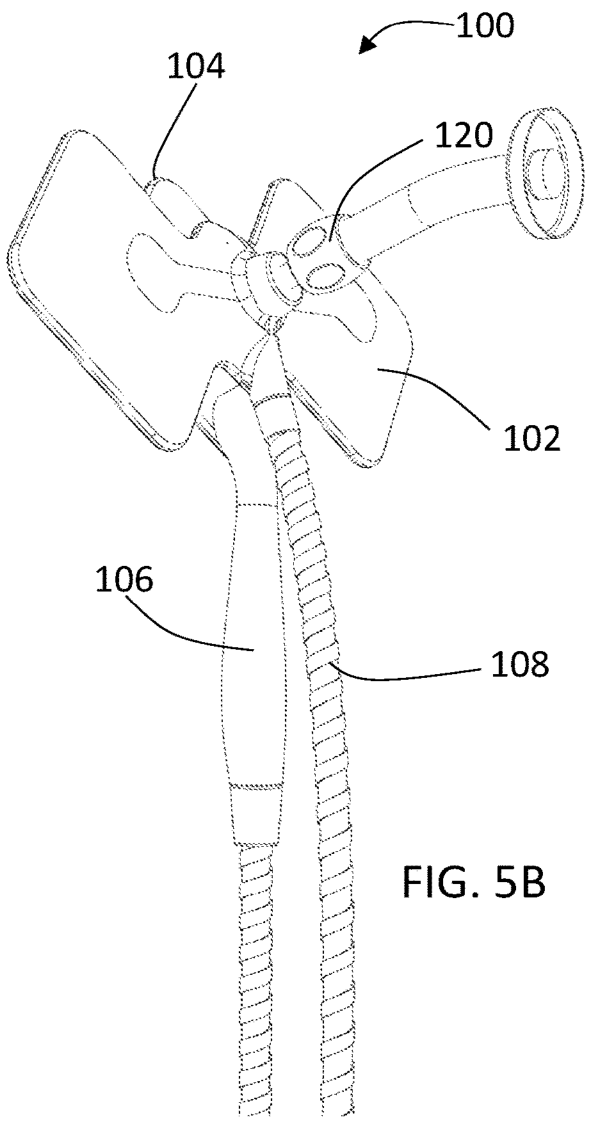
Figure 6A:
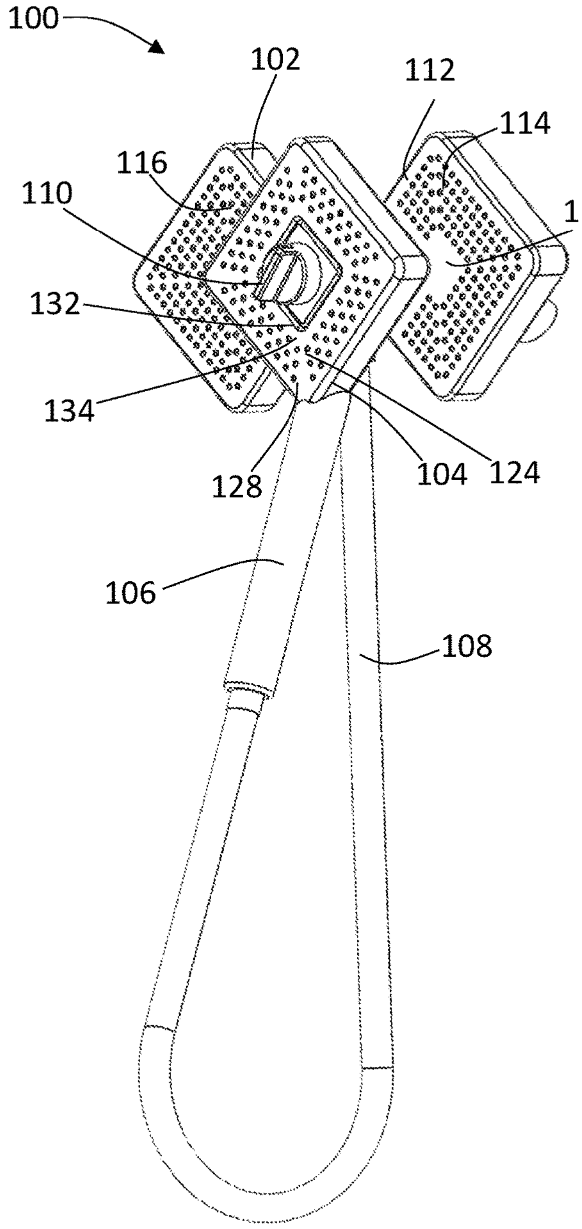
FIGS. 6A and 6B respectively show front perspective and rear perspective views of a showerhead system according to embodiments of the present disclosure.
Figure 6B:
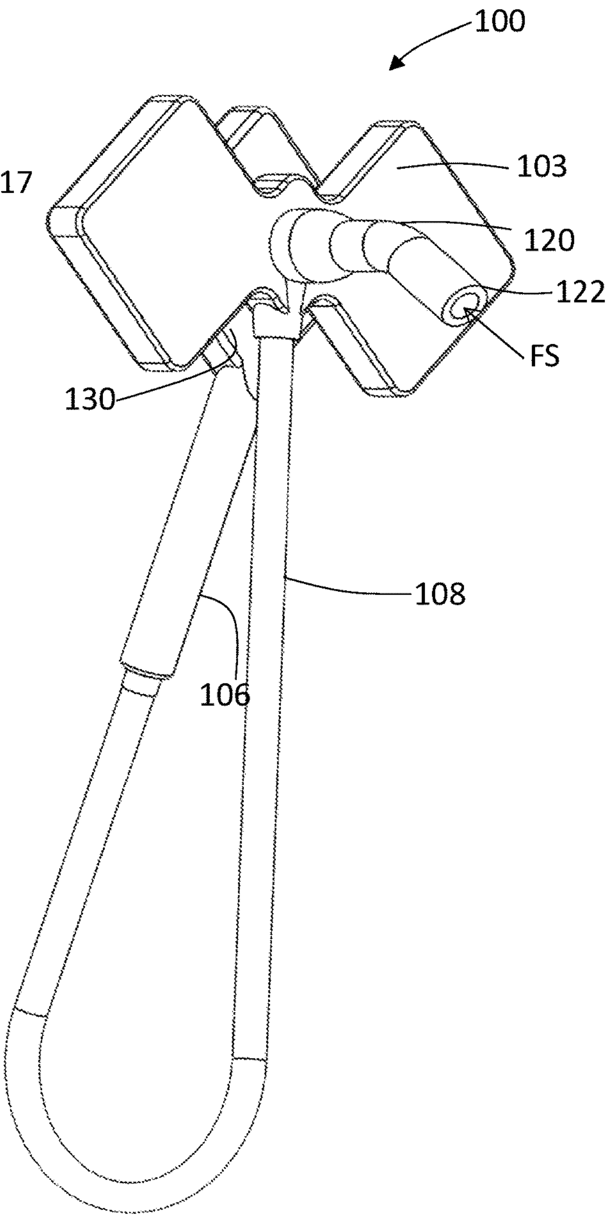
Figure 6C:
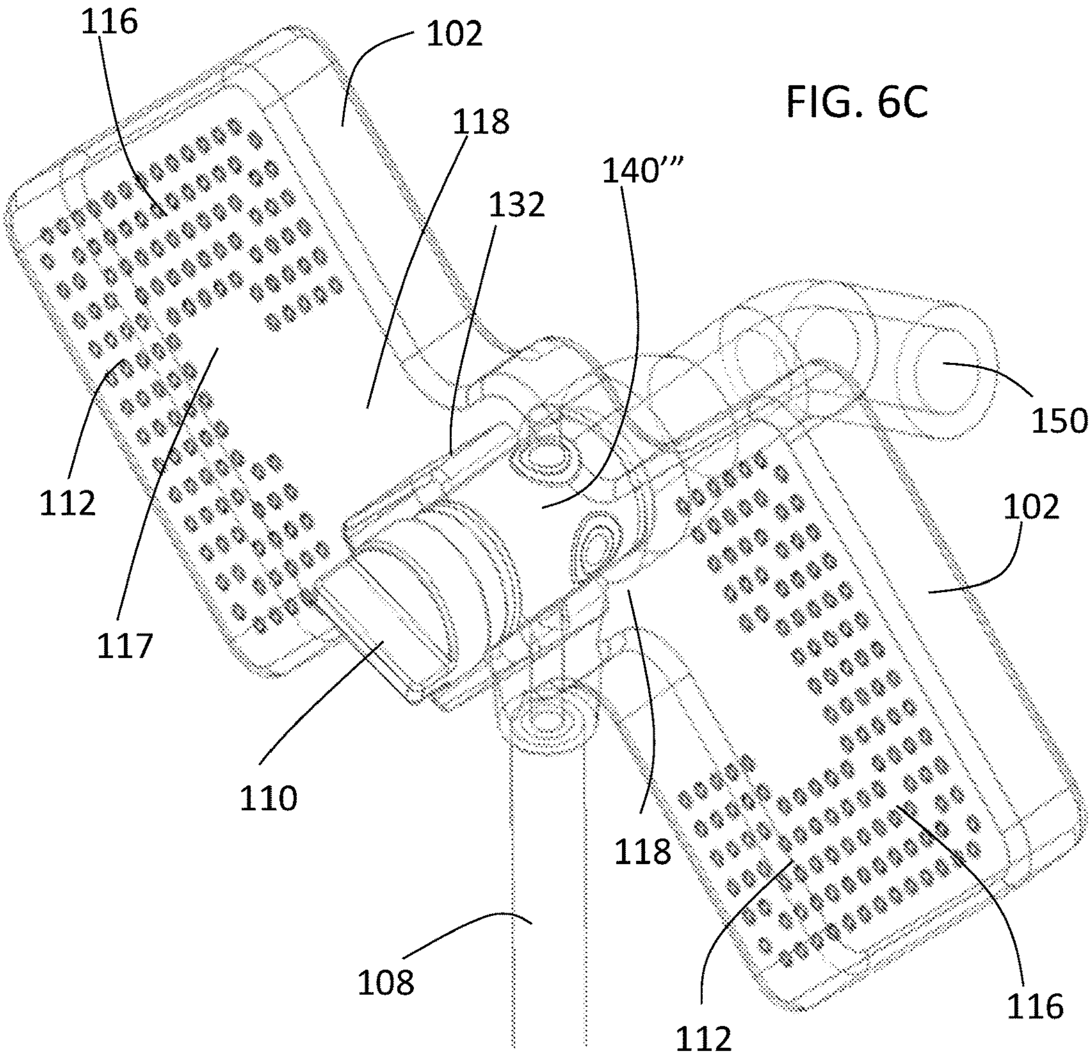
FIG. 6C is a transparent perspective view of a fixed fluid dispensing unit according to embodiments of the present disclosure containing the fluid diverter according to embodiments of the present disclosure.
Figure 6D:
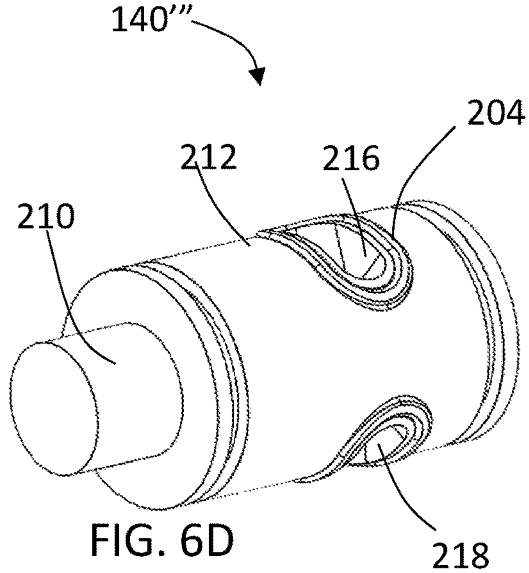
FIG. 6D is a perspective view of the fluid diverter of FIG. 6C.
Figure 7A:
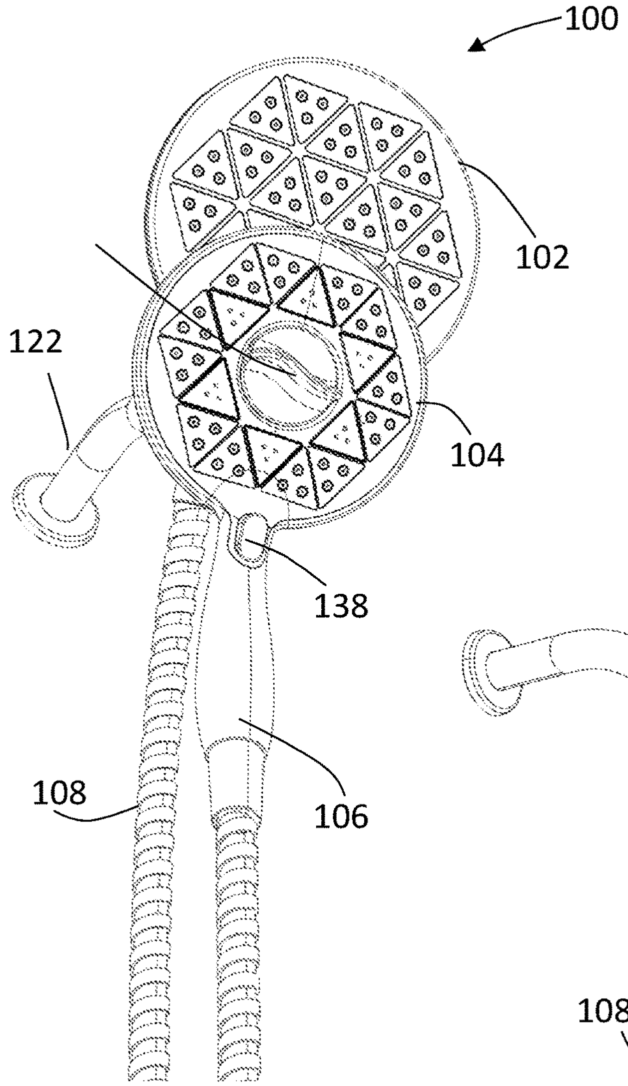
FIG. 7A is front perspective view of a showerhead system according to embodiments of the present disclosure with a removable fluid dispensing unit engaged with a fixed fluid dispensing unit according to embodiments of the present disclosure.
Figure 7B:
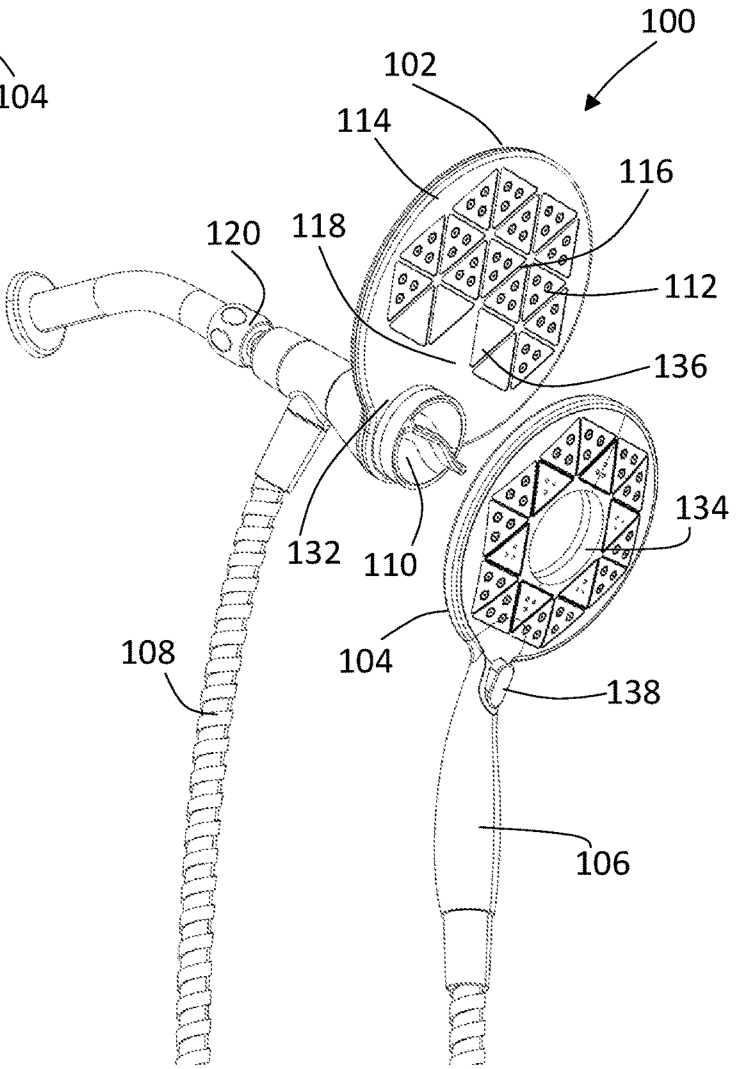
FIG. 7B is front perspective view of the showerhead system of FIG. 7A with the removable fluid dispensing unit removed from the fixed fluid dispensing unit according to embodiments of the present disclosure.
Figure 8:
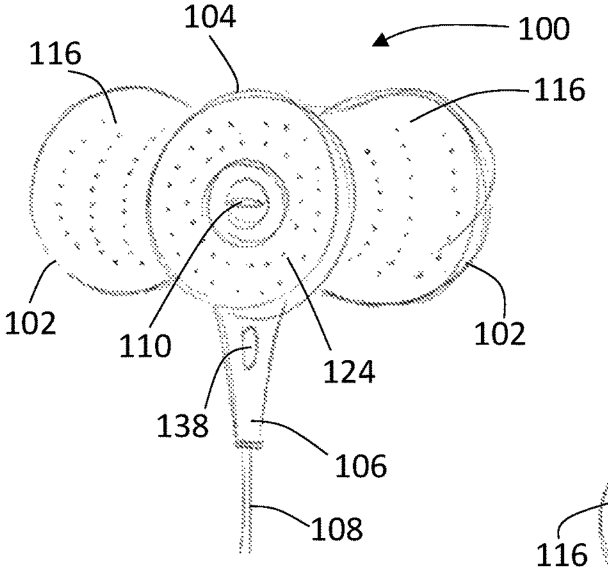
FIG. 8 is a front view of a showerhead system according to embodiments of the present disclosure.
Figure 9:
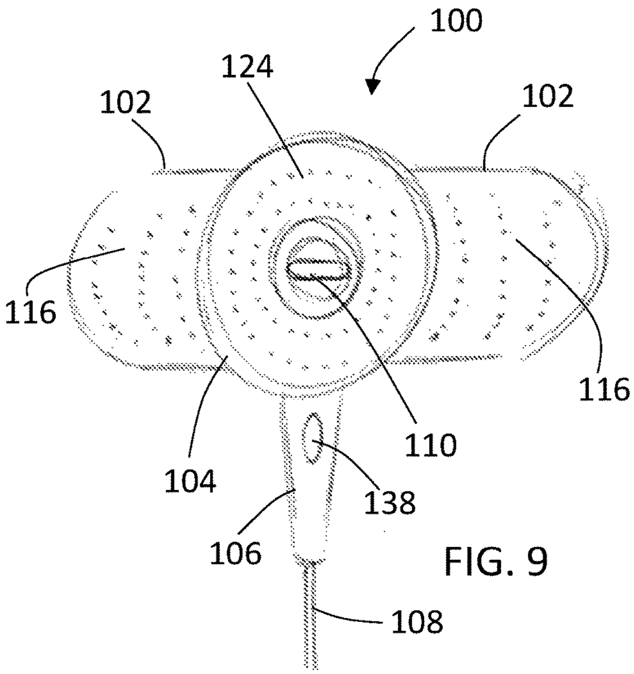
FIG. 9 is a front view of a showerhead system according to embodiments of the present disclosure.
Figure 10A:
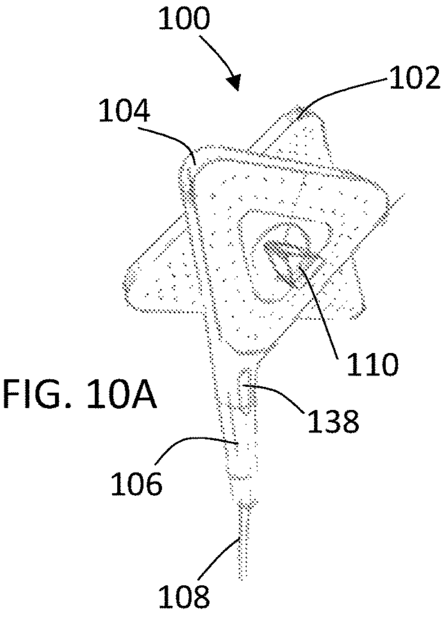
FIG. 10A is front perspective view of a showerhead system according to embodiments of the present disclosure with a removable fluid dispensing unit engaged with a fixed fluid dispensing unit according to embodiments of the present disclosure.
Figure 10B:
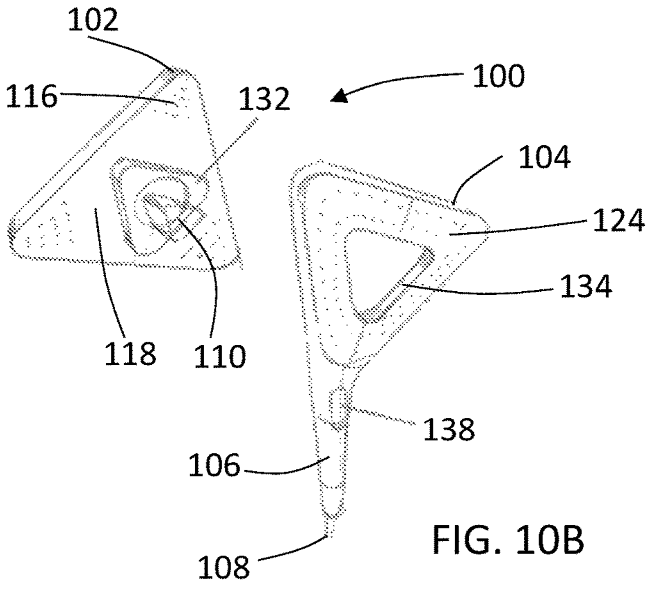
FIG. 10B is front perspective view of the showerhead system of FIG. 10A with the removable fluid dispensing unit removed from the fixed fluid dispensing unit according to embodiments of the present disclosure.
Figure 11A:
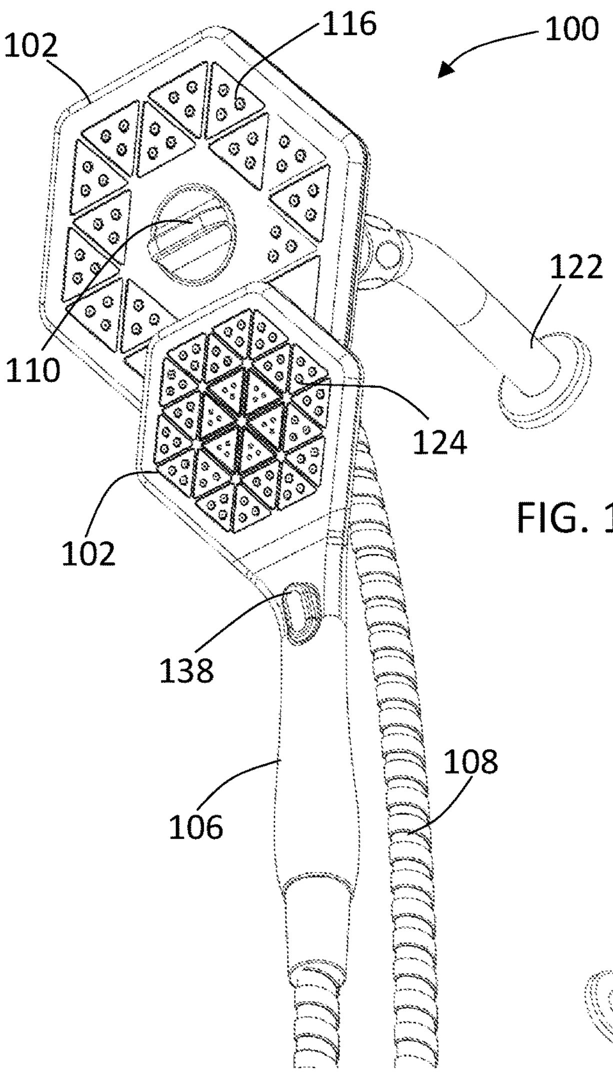
FIG. 11A is front perspective view of a showerhead system according to embodiments of the present disclosure with a removable fluid dispensing unit engaged with a fixed fluid dispensing unit according to embodiments of the present disclosure.
Figure 11B:
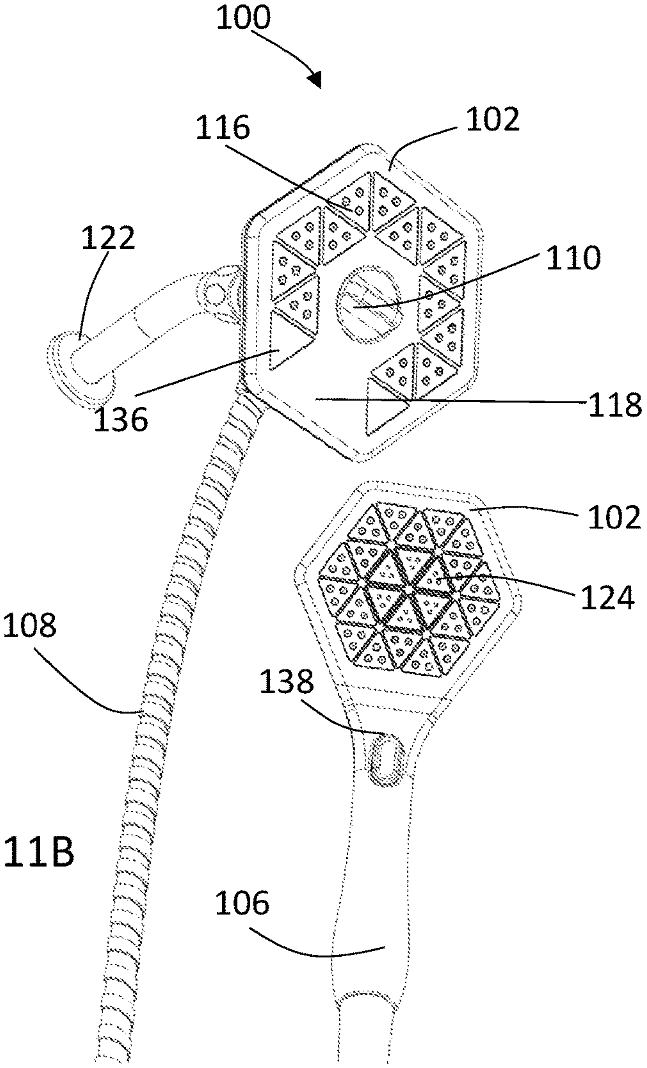
FIG. 11B is front perspective view of the showerhead system of FIG. 11A with the removable fluid dispensing unit removed from the fixed fluid dispensing unit according to embodiments of the present disclosure.
Figure 12:
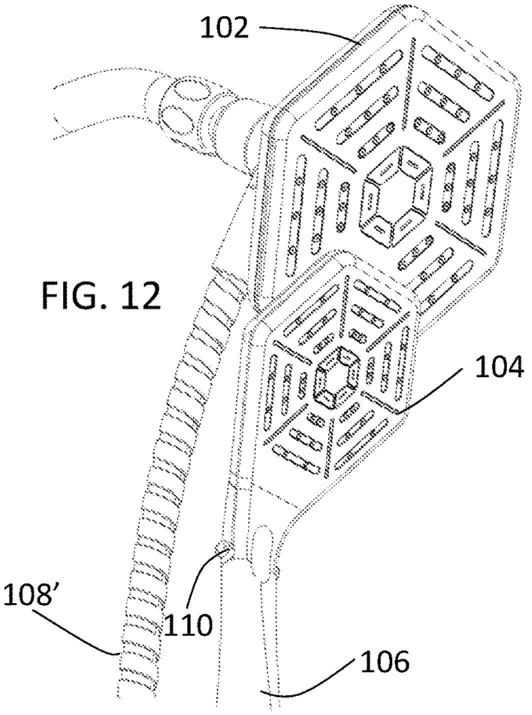
FIG. 12 is a perspective view of a showerhead system having a diverter interface positioned in a removable fluid dispensing unit according to embodiments of the present disclosure.

The fixed fluid dispensing unit 102 is supported at a location. The fixed location illustratively includes a fixed vertical or wall surface adjacent to or at the fluid supply FS, such as that which is typically associated with a shower enclosure or wall surface associated with a bathtub, or a Roman tub edge. The fixed fluid dispensing unit 102 includes a plurality of fixed nozzle apertures 112 arranged on the fixed spray face 114 of the fixed fluid dispensing unit 102. The fixed nozzle apertures 112 are arranged within a first area 116 of between 55 and 95 percent of the fixed spray face 114. The fixed nozzle apertures 112 act as fluid outlets and are optionally formed in any desired pattern or arrangement, and can also be provided in different sizes and spray dispersion patterns within the skill of one in the ordinary art. For example, as shown in FIGS. 1A-2B and other figures, the fixed nozzle apertures 112 are uniformly sized and uniformly arranged in uniformly spaced columns and rows to cover the first area 116 of the fixed spray face. Alternatively, as shown in FIG. 7A, the fixed nozzle apertures 112 are uniformly sizes and arranged in sets of apertures forming a repeating triangle pattern within the first area 116 of the fixed spray face. Further still, as shown in FIGS. 8 and 9, the fixed nozzle apertures 112 are uniformly sized and arranged in arcing rows within the first area 116 of the fixed spray face. As yet another example, as shown in FIG. 12, the fixed nozzle apertures 112 within the first area 116 of the fixed spray face include apertures of differing shapes and sizes, e.g. circular apertures are arranged in lines that encircle a center of the fixed spray face. Within these lines of circular apertures, the outermost apertures are spaced apart at a greater distance than those closer to the center of the fixed spray face. At the center of the fixed spray face shown in FIG. 12, there are small linear apertures. Accordingly, as shown in FIG. 12, the fixed nozzle apertures 112 within the first area 116 of the fixed spray face 114 may include apertures of various shapes and sizes arranged within the first area 116 in any arrangement or pattern. The fixed spray face 114 also includes a second area 118 that is devoid of any nozzle apertures. The first area 116 and the second area 118 are contiguous, meaning they are next to each other in sequence and share a common border. According to embodiments, the first area 116 and the second area 118 are in the same plane as one another such that the fixed spray face 114 is planar and does not define or include any recesses therein, thereby making the showerhead system 100 streamlined and aesthetically pleasing and easy to clean. According to embodiments, the second area 118 of the fixed spray face 114 is positioned within a lower half of the fixed spray face 114 of the fixed fluid dispensing unit 102, for example as shown in FIGS. 1A-1C, 2A, 2B, 4D, 7A, 7B, 11A, 11B, and 12-14. According to embodiments, the second area 118 of the fixed spray face 114 is positioned within a central region of the fixed spray face 114 of the fixed fluid dispensing unit 102, for example as shown in FIGS. 5A, 5B, 6A, 6B, 6C, 8, 9, 10A, 10B, and 17. According to embodiments, the fixed nozzle apertures 112 cover the first area 116 of the fixed spray face 114 of the fixed fluid dispensing unit 102, for example as best shown in FIG. 4D. According to other embodiments, such as best shown in FIGS. 6A and 6C, the first area 116 of the fixed spray face 114 includes areas 117 that are devoid of fixed nozzle apertures 112 and separate from the second area 118 of the fixed spray face 114 in that the area 117 are without fixed nozzle apertures 112 and also not covered by the removable fluid dispensing unit 104 when the units are engaged.

The fixed fluid dispensing unit 102 includes an inlet end 122, such further including an internal passageway for communicating a fluid flow from the fluid supply FS, such as originating from a pipe or tubing extending in communication with the inlet end 122. According to embodiments, the fixed fluid dispensing unit 102 is supported at the location, such as a wall or vertical surface adjacent or at the fluid supply by an articulating joint 120 located intermediate between the fluid supply inlet 122 and the array of dispensing nozzles 112 on the fixed spray face 114. The fixed fluid dispensing unit 102 may thus be repositioned by virtue of the articulating joint 120. The articulating joint 120 is appreciated to be any conventional adjustment mechanism known to the art, such as a ball joint type or other means of adjustment that affords the ability to tilt and/or rotate the inventive showerhead.

Figure 13:
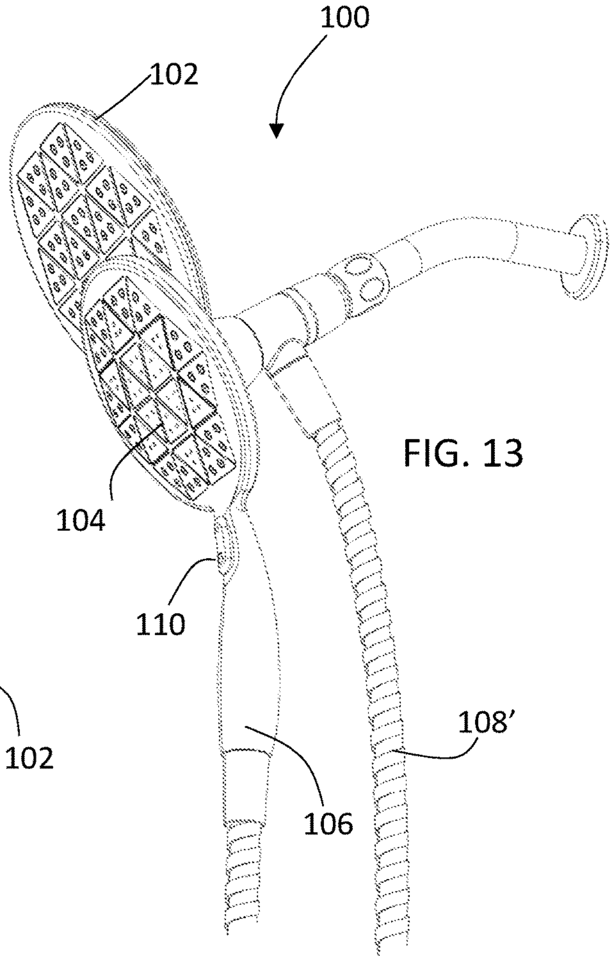
FIG. 13 is a perspective view of a showerhead system having a diverter interface positioned in a removable fluid dispensing unit according to embodiments of the present disclosure.
Figure 14:
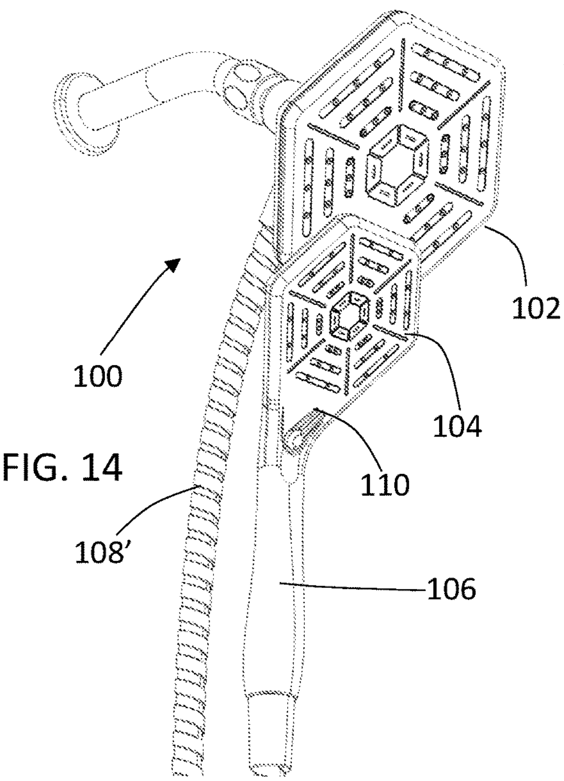
FIG. 14 is a perspective view of a showerhead system having a diverter interface positioned in a removable fluid dispensing unit according to embodiments of the present disclosure.

The removable fluid dispensing unit 104 is configured to removably engage with the fixed fluid dispensing unit 102. The removable fluid dispensing unit 104 has a front face 124 that defines a front face area 128. A plurality of removable nozzle apertures 126 are arranged on the front face 124 of the removable fluid dispensing unit 104. It will be understood that the removable nozzle apertures 126 are not removable from the removable fluid dispensing unit 104 but are named as such to distinguish the nozzle apertures 126 on the removable fluid dispensing unit 104 from the fixed nozzle apertures 112 of the fixed fluid dispensing unit 102. The removable nozzle apertures 126 act as fluid outlets and are optionally formed in any desired pattern or arrangement, and can also be provided in different sizes and spray dispersion patterns within the skill of one in the ordinary art. For example, as shown in FIGS. 1A-2B and other figures, the removable nozzle apertures 126 are uniformly sized and uniformly arranged in uniformly spaced columns and rows to cover the front face area 128 of the front face 124. Alternatively, as shown in FIGS. 7A, 7B, 11A, and 11B, the removable nozzle apertures 126 include large apertures arranged in sets of apertures forming triangles around the outer edge of the front face 124 and further including small apertures arranged in sets of apertures forming smaller triangles arranged in a star pattern closer to the center of the front face 124. Furthermore, as shown in FIG. 13 the removable nozzle apertures 126 include three sizes of apertures. As yet another example, as shown in FIGS. 12 and 14, the removable nozzle apertures 126 within the front face area 128 of the front face 124 include apertures of differing shapes and sizes, e.g. circular apertures are arranged in lines that encircle a center of the front face 124. Within these lines of circular apertures, the outermost apertures are spaced apart at a greater distance than those closer to the center of the front face 124. At the center of the front face shown in FIGS. 12 and 14, there are small linear apertures. Accordingly, as shown in FIGS. 12 and 14, the removable nozzle apertures 126 within the front face area 128 of the front face 124 may include apertures of various shapes and sizes arranged within the front area 128 in any arrangement or pattern. According to embodiments, the removable nozzle apertures 126 cover the front face area 128 of the front face 124 of the removable fluid dispensing unit 104. According to other embodiments, the front face area 128 of the front face 124 includes areas that are devoid of removable nozzle apertures 126.

The removable fluid dispensing unit 104 additionally includes a back surface 130 that is in opposition to the front face 124 of the removable fluid dispensing unit 104. To engage with the fixed fluid dispensing unit 102, the back surface 130 of the removable fluid dispensing unit 104 overlaps or covers the second area 118 of the fixed spray face 114. In this engaged relationship, the removable fluid dispensing unit 104 is layered or stack on the fixed spray face 114 of the fixed fluid dispensing unit 102 and accordingly protrudes from the fixed spray face 114 of the fixed fluid dispensing unit 102, such that the front face 124 of the removable fluid dispensing unit 104 and the fixed spray face 114 of the fixed fluid dispensing unit 102 are not in the same plane, but instead are in planes offset by the thickness of the removeable fluid dispensing unit 104 between the back surface 130 and the front face 124.

Notably, the front face area 128 of the removable fluid dispensing unit 104 is larger than the second area 118 of the fixed spray face 114 of the fixed fluid dispensing unit 102, which allows the removable fluid dispensing unit 104 to overlap or cover the second area 118 of the fixed spray face 114 while also being super complementary to the fixed fluid dispending unit 102. As used herein, the term super complementary means that the removable fluid dispensing unit 104, and more particularly the front face 124 of the removable fluid dispensing unit 104, overhangs the fixed spray face 114 of the fixed fluid dispensing unit 102. In other words, when the removable fluid dispensing unit 104 is engaged with the fixed fluid dispensing unit 102, the removable nozzle apertures 126 of the front face area 124 extend beyond the fixed spray face 114 of the fixed fluid dispensing unit 102. As shown throughout the figures, when the two units are engaged, the removable nozzle apertures 126 of the front face area 124 cover the second area 118 of the fixed unit 102, thus complementing the nozzle apertures 112 of the first area 116 such that the entirety of the fixed spray face 114 is covered by the combination of the nozzle apertures 112 of the fixed unit and a portion of the removable nozzle apertures 126 of the removable unit 104. Additionally, a remaining portion of the removable nozzle apertures 126 extend beyond the area of the fixed spray face 114 in a super complementary fashion.

According to embodiments, the fixed fluid dispensing unit 102 has a shape that is the same as a shape of the removable fluid dispensing unit 104, that is, the overall shape of the fixed fluid dispensing unit 102 is in the same geometric family as the overall shape of the removable fluid dispensing unit 104. As shown throughout the figures the fixed fluid dispensing unit 102 and the removable fluid dispensing unit 104 each have an overall square shape, rectangular shape, triangular shape, circular shape, round shape, or diamond shape. According to embodiments, the fixed fluid dispensing unit 102 is larger than the removable fluid dispensing unit 104. According to embodiments, the fixed spray face 114 of the fixed fluid dispensing unit 102 has an overall surface area that is greater than or equal to the front face area 128 of the removable fluid dispensing unit 104.

Figure 15A:
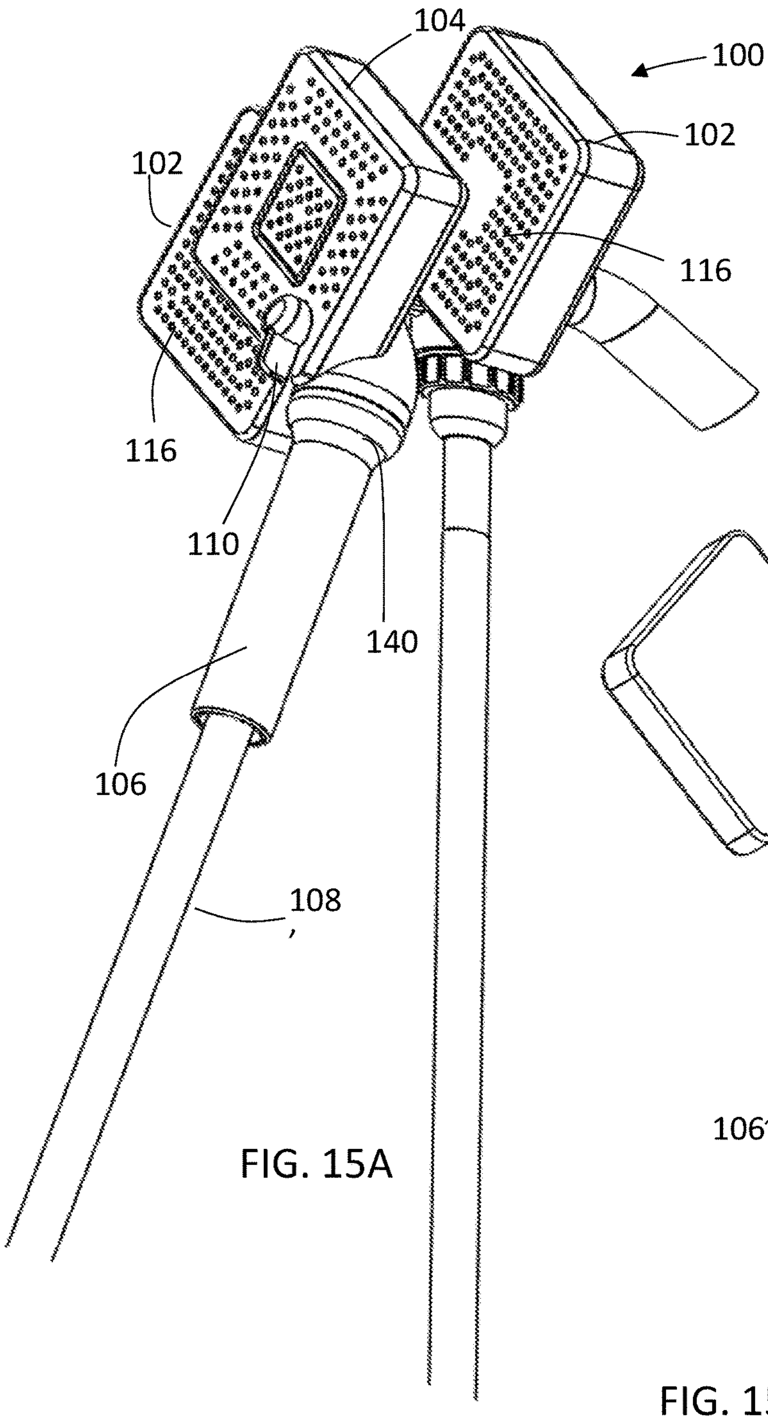
FIGS. 15A and 15B respectively show front perspective and rear perspective views of a showerhead system having a diverter interface positioned in a removable fluid dispensing unit according to embodiments of the present disclosure.
Figure 15B:
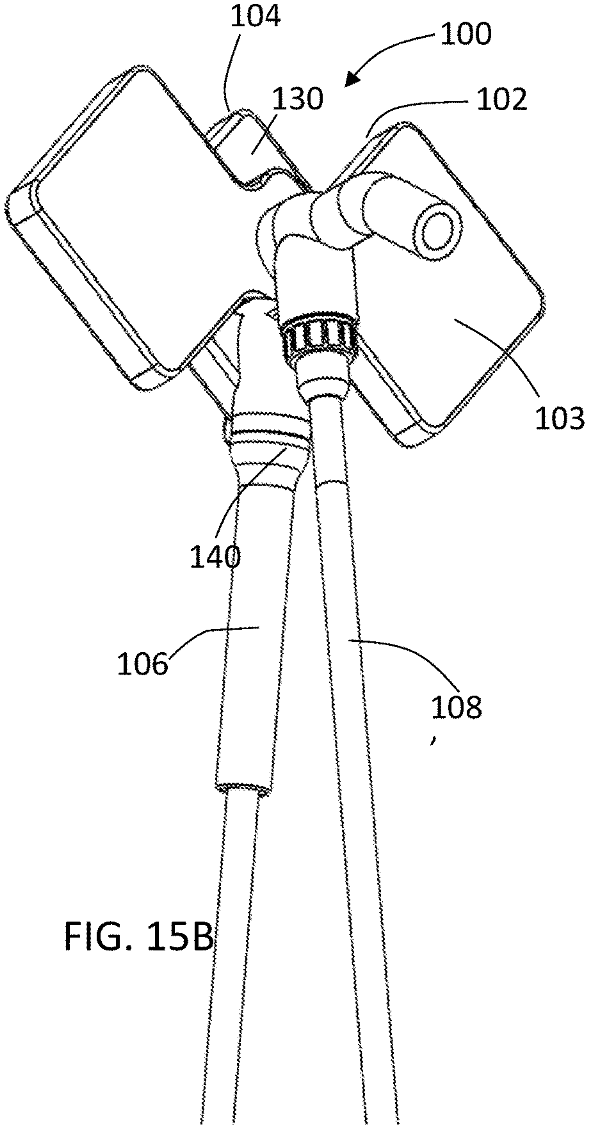
Figure 15C:
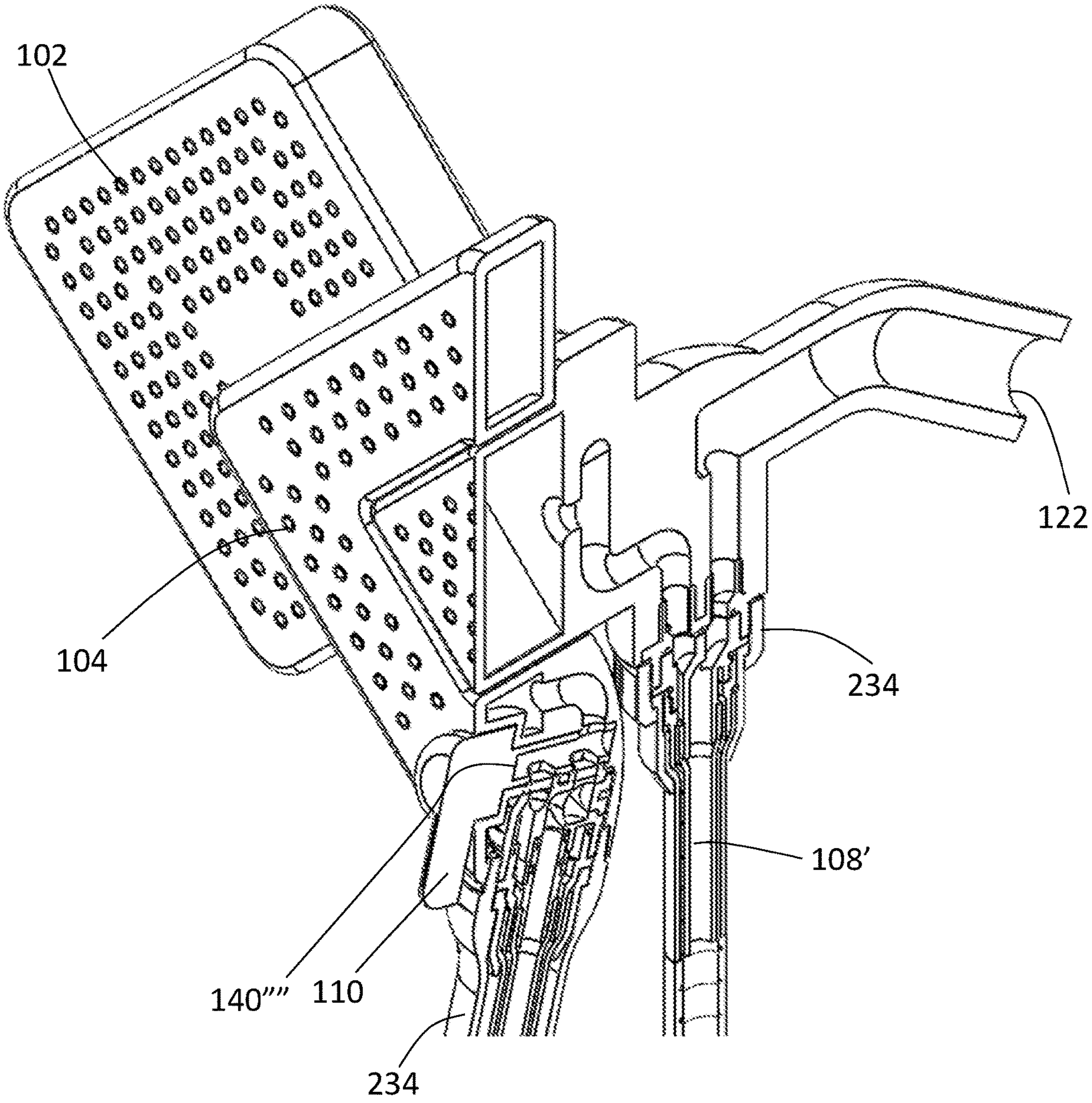
FIG. 15C is a cross-sectional view of the showerhead system of FIGS. 15A and 15B.

According to embodiments, the removable fluid dispensing unit 104 engages with the fixed fluid dispending unit 102 by a friction fit engagement or by magnetic coupling. That is, according to embodiments such as those shown in FIGS. 1A-1C, 2A-2B, 4D, 5A-5B, 6A-6B, 7A-7B, 8-10B, 15A, an engagement hub 132 protrudes from the fixed spray face 114 of the fixed fluid dispensing unit 102 while the removable fluid dispensing unit 104 defines a through hole 134 that extends between the front face 124 and the opposing back surface 130. The through hole 134 is adapted to surround and engage with the engagement hub 132. Such engagement may be through use of a friction fit between the through hole 134 and the engagement hub 132. According to embodiments, such as those shown in FIG. 15A, the engagement hub 132 includes a plurality of fixed nozzle apertures 112. According to embodiments, a magnet is alternatively or additionally used to hold the through hole 134 and the engagement hub 132 together. According to embodiments, the front mounted diverter interface 110 protrudes from the fixed spray face 114 at the engagement hub 132 and the through hole 134 accordingly surrounds the front mounted diverter interface 110. According to embodiments such as those shown in FIGS. 11A-14, the removable fluid dispensing unit 104 engages with the fixed fluid dispending unit 102 by magnetic coupling alone. According to such embodiments, at least one magnet 136 is disposed within one of the fixed fluid dispensing unit 102 and the removable fluid dispending unit 104. The magnet 136 being configured to removably attach the removable fluid dispending unit 104 to the fixed fluid dispensing unit 102. According to embodiments, the magnet 136 is disposed with the second area 118 of the fixed spray face 114 of the fixed fluid dispensing unit 102. In such embodiments where a magnet 136 is used to removably attach the removable fluid dispending unit 104 to the fixed fluid dispensing unit 102, a magnet release button 138 may be provided on the handle 106 that extends from the removable fluid dispending unit 104. The magnet release button 138 configured to disengage the at least one magnet 136 to detach the removable fluid dispending unit 104 from the fixed fluid dispensing unit 102.

According to embodiments, when the showerhead system 100 is wall mounted and the removable fluid dispensing unit 104 is engaged with and overlaps the fixed fluid dispensing unit 102 the removable fluid dispensing unit 104 and the fixed fluid dispensing unit 102 define a vertical plane of symmetry therethrough. According to embodiments, when the system 100 is wall mounted and the removable fluid dispensing unit 104 is engaged with and overlaps the fixed fluid dispensing unit 102, the removable fluid dispensing unit 104 and the fixed fluid dispensing unit 102 define a horizontal plane of symmetry therethrough. According to embodiments, when the system 100 is wall mounted and the removable fluid dispensing unit 104 is engaged with and overlaps the fixed fluid dispensing unit 102, the removable fluid dispensing unit 104 and the fixed fluid dispensing unit 102 define a three-fold axis of symmetry therethrough.

The fount mounted diverter interface 110 is configured to actuate a fluid diverter 140. The fluid diverter 140, such as a valve, "T" connector or other suitable directional flow control element, lever, or knob, is located in fluid communication with the inlet 122 and fluid supply FS and the fixed nozzle apertures 122 and removable nozzle apertures 126 by way of the fluidly connected hose 108. According to embodiments, the hose 108 is connected between the fixed fluid dispensing unit 102 and the handle 106 extending from said removable fluid dispensing unit 104. According to embodiments, the hose 108 is formed of a flexible material. The hose 108 maybe provided having a length of between one and six feet.

As will be further described, the fluid diverter 140 facilitates selective or combined fluid flow to either or both of the fixed fluid dispensing unit 102 and the removable fluid dispensing unit 104, via the hose 108, associated with the showerhead system 100. The fluid diverter 140 that is actuated by the front mounted diverter interface 110 provides an easy to use and reach control especially for elderly, shorter people, and children. According to embodiments, the diverter interface 110 is a rotatable knob (as in FIG. 5A, 6A-11B), a rotatable lever (as in FIG. 14), a push button (as in FIGS. 2A and 12), or a rocker button (as in FIG. 13). According to embodiments, the fluid diverter 140 additionally provides multiple spray function modes associated with the removable fluid dispensing unit 104 and/or the fixed fluid dispensing unit 102, illustratively including a variable spray or pulse pattern. Notably, the fluid diverter 140 is integral with either the fixed fluid dispensing unit 102 or the handle 106 that extends from the removable fluid dispensing unit 104. The integration of the fluid diverter 140 into the fixed fluid dispensing unit 102 or the handle 106 streamlines the design and aesthetic appeal of the showerhead system 100 and simplifies installation, maintenance, and cleaning of the showerhead system 100.

According to embodiments in which the fluid diverter 140 is integral with the fixed fluid dispensing unit 102, such as in FIGS. 2A-2B, 4D, 5A-5B, 6A-6C, 6F-6H, 7A-7B, 8-10B, 11A-11B, the diverter interface 110 protrudes from the fixed spray face 114 of the fixed fluid dispensing unit 102. According to further embodiments, the hose 108 fluidly connects to the removable fluid dispensing unit 104 from the fluid diverter 140 positioned within the fixed fluid dispensing unit 102. According to embodiments, such as that shown in FIGS. 12-15D, the fluid diverter 140 that is integral with the fixed fluid dispensing unit 102 is a push button diverter 140', 140" actuated by a front mounted diverter interface 110 that is a push button. According to embodiments, the push button diverter 140', as shown in FIGS. 3A-3F includes a push button diverter interface 110 configured to be front mounted on the fixed fluid dispensing unit 102 and a fluid inlet 150 configured to receive a fluid from the fluid supply FS. The push button diverter interface 110 is spring loaded and pivotally attached to an index arm 152 and a rachet arm 154, each having a tooth 156 near an end thereof. The teeth 156 engage with a toothed ratchet wheel 158. The teeth 156 of the index arm 152 and the rachet arm 154 are urged into contact with the toothed ratchet wheel 158 by a pre-loaded spring 160. Fluid from the fluid supply FS enters the diverter 140' from the inlet 150 and flows to a diverter housing 162 that is enclosed by housing cover 164 and sealed by at least one gasket 166. The cover housing 164 defines two outlets, a first outlet 168 configured to provide fluid from the diverter 140' to the nozzles 112 of the fixed fluid dispensing unit 102 and a second outlet 170 configured to supply fluid from the diverter 140' to the nozzles 126 of the removable fluid dispensing unit 104, via the hose 108. Within the diverter housing 162 is a selector plate 172. The selector plate 172 includes a plurality of through holes 174 and solid sections 176 arranged in a circular pattern on the selector plate 172, each being surrounded by an O-ring 178. The selector plate 172 is connected to the ratchet wheel 158 through the diverter housing 162. With each press of the push button diverter interface 110, the ratchet arm rotates 154 the ratchet wheel 158 while the index arm 152 ensures the ratchet wheel 158 is only rotated by one notch for each push of the diverter interface 110. The rotation of the ratchet wheel 158 accordingly rotates the selector plate 172 thus aligning the through holes 174 or the solid sections 176 of the selector plate 172 with the fluid inlet 151 to the diverter housing 162, which is in fluid communication with the diverter fluid inlet 150 that receives fluid from the fluid supply FS. Based on the alignment of the selector plate 172 with the inlet 151 and the outlets 168, 170, the diverter directs fluid to the fixed shower head 102, the removable shower head 104, or both. While FIGS. 3A-3F show the diverter 140' diverting water to three chambers only, the diverter 140' can control less or more chambers and could also provide a pause function in which water is not supplied to any chamber.

According to embodiments, the push button diverter 140", as shown in FIGS. 4A-4D includes a push button diverter interface 110 configured to be front mounted on the fixed fluid dispensing unit 102 and a fluid inlet 150 configured to receive a fluid from the fluid supply FS. The push button diverter interface 110 includes an internal helix 180 that interacts with a drum 182 that has a corresponding external helix 184. A spring 186 is positioned within the drum 182 and the push button diverter interface 110 and biases the push button diverter interface 110 away from the drum 182 as a positional reset. The diverter 140" further includes a diverter core 188 that has a core inlet 190 and two fluids outlets 192, 194. Pressing the push button diverter interface 110 move the button 110 linearly, while the internal helix 180 moves within the external helix 184 thereby rotating the drum 182. The far end of the drum includes flexible teeth 196 that are configured to engage with a plurality of recesses 198 on the abutting end of the core 188. The rotational movement of the drum 182 rotates the diverter core 188 through the interaction of the flexible teeth 196 and the recesses 198 on the end of the diverter core 188. Upon releasing the push button diverter interface 110, the reset spring 186 returns the push button 110 and drum 182 to their place while the diverter core 188 stays in place as the flexible teeth 196 provide a ratchet feature. The rotation of the diverter core 188 causes the outlets 192, 194 to selectively align with a first waterway 200 configured to supply fluid from the diverter 140" to the nozzles 112 of the fixed fluid dispensing unit 102 and a second waterway 202 configured to supply fluid from the diverter 140" to the nozzles 126 of the removable fluid dispensing unit 104, via the hose 108. Thus, each press on the push button diverter interface 110 diverts the fluid from the fluid supply FS to flow from one chamber to the other. The core 188 is sealed within a housing 193 of the diverter 140" by a plurality of gaskets 208. Further, the outlets 192, 194 are surrounded by O-rings 204 that according to embodiments are spring 206 loaded to minimize friction as the core 188 rotates while ensure a leak proof seal with the waterways 200, 202 when aligned. Based on the alignment of the outlets 192, 194 with waterways 200, 202, the diverter 140" directs fluid to the fixed shower head 102, the removable shower head 104, or both. While FIGS. 4A-4D show the diverter 140" diverting water to three chambers only, the diverter 140" may control less or more chambers and could also provide a pause function in which water is not supplied to any chamber.

Figure 6E:
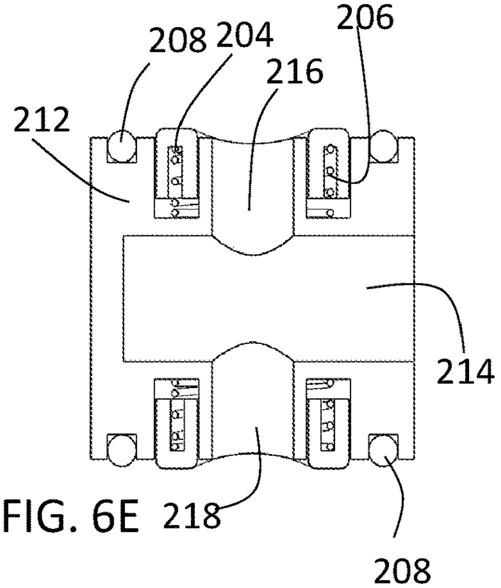
FIG. 6E is a cross-sectional view of the fluid diverter of FIG. 6C.
Figure 6F:
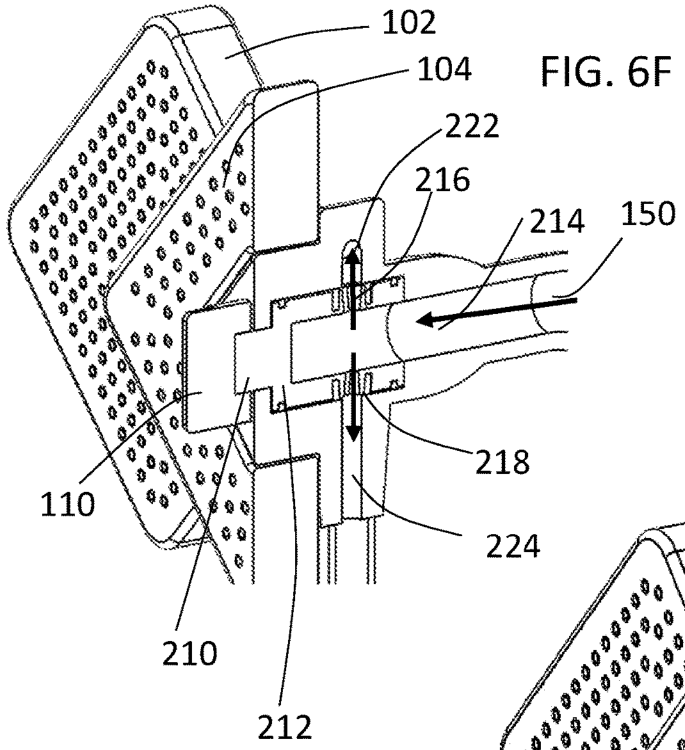
FIG. 6F is a cross-sectional view of the showerhead system of FIGS. 6A and 6B with the fluid diverter positioned to provide fluid to a fixed unit and a removable unit of the showerhead system.
Figure 6G:
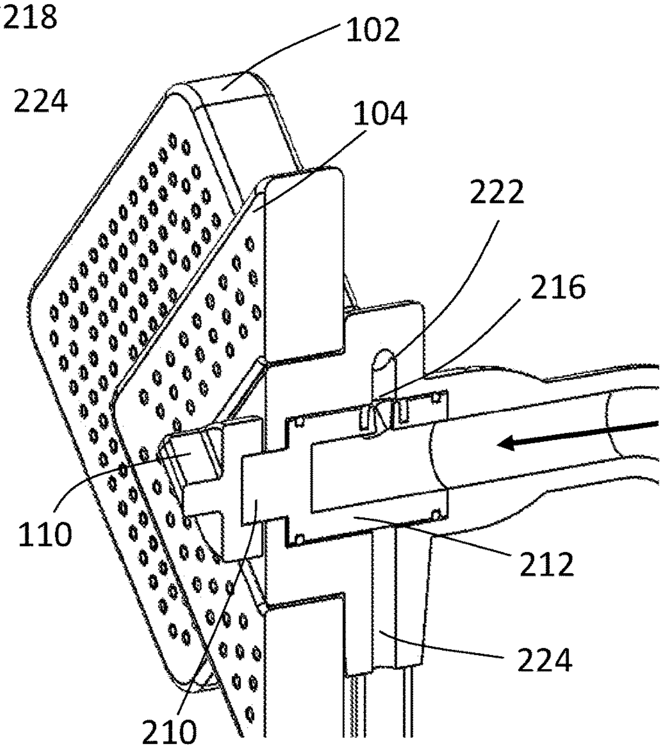
FIG. 6G is a cross-sectional view of the showerhead system of FIGS. 6A and 6B with the fluid diverter positioned to provide fluid to only a fixed unit of the showerhead system.
Figure 6H:
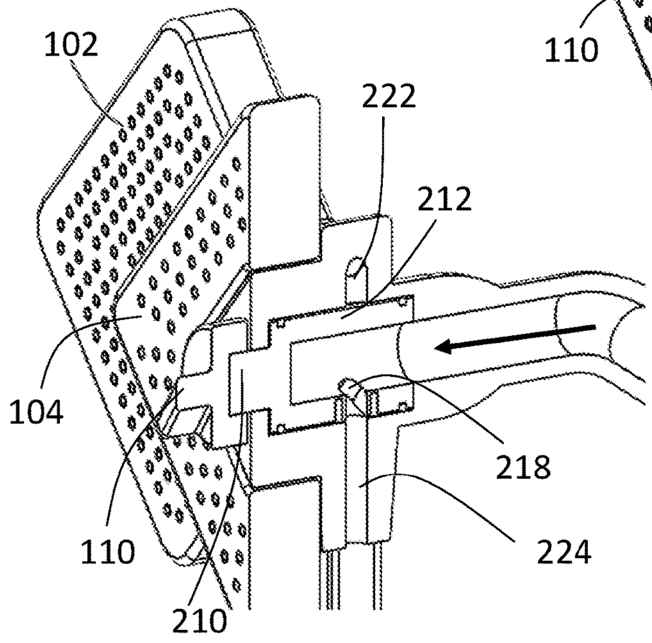
FIG. 6H is a cross-sectional view of the showerhead system of FIGS. 6A and 6B with the fluid diverter positioned to provide fluid to only a removable unit of the showerhead system.

According to embodiments, such as that shown in FIGS. 6A-6H, the fluid diverter 140 that is integral with the fixed fluid dispensing unit 102 is a rotatable knob diverter 140''' actuated by a front mounted diverter interface 110 that is a rotatable knob. According to embodiments, the rotatable knob diverter 140''', as shown in FIGS. 6A-6H includes a rotatable knob diverter interface 110 configured to be front mounted on the fixed fluid dispensing unit 102 and a fluid inlet 150 configured to receive a fluid from the fluid supply FS. The rotatable knob diverter interface 110 is directly fixed to a knob 210 of a diverter core 212 such that rotation of the rotatable knob diverter interface 110 also rotates the diverter core 212 that is positioned within the fixed fluid dispensing unit 102. As best shown in FIGS. 6E, the diverter core 212 includes an inlet opening that is in fluid communication with the fluid supply FS. The diverter core 212 also includes a first outlet 216 and a second outlet 218. The core 212 is positioned within a housing 220. The housing 220 includes channels 222, 224 that fluidly communicate with the fixed fluid dispensing unit 102 and the removable fluid dispensing unit 104, respectively. The core 212 is sealed within the housing 220 of the fixed fluid dispensing unit 102 by a plurality of gaskets 208. Further, the outlets 216, 218 are surrounded by O-rings 204 that according to embodiments are spring 206 loaded to minimize friction as the core 212 rotates while ensuring a leak proof seal with channels 222, 224 that are formed in the housing 220 when aligned. Upon rotation of the rotatable knob diverter interface 110, the diverter core 212 rotates within the housing 220 to selectively align the outlets 216, 218 of the core 212 with the first channel 222 configured to supply fluid from the diverter 140''' to the nozzles 112 of the fixed fluid dispensing unit 102 and a second channel 224 configured to supply fluid from the diverter 140''' to the nozzles 126 of the removable fluid dispensing unit 104, via the hose 108. Thus, each rotation of the rotatable knob diverter interface 110 diverts the fluid from the fluid supply FS to flow from one chamber to the other. Based on the alignment of the outlets 216, 218 with channels 222, 224, the diverter 140''' directs fluid to the fixed shower head 102, the removable shower head 104, or both, as shown by the arrows in FIGS. 6F-6H. While FIGS. 6A-6H show the diverter 140''' diverting water to three chambers only, the diverter 140''' may control less or more chambers and could also provide a pause function in which water is not supplied to any chamber.

According to embodiments in which the fluid diverter 140'''' is integral with the removable fluid dispensing unit 104, such as in FIGS. 15A-15D, the diverter interface 110 protrudes from the handle 106 that extends from the removable fluid dispensing unit 104. According to embodiments, the diverter interface 110 is a three position push button diverter, as in FIGS. 12 and 13, where a first position of the button allows fluid to flow from the fluid supply FS to the fixed unit 102 only, where a second position of the button allows fluid to flow from the fluid supply FS to the removable unit 104 only, and where a third position of the button allows fluid to flow from the fluid supply FS to both the fixed unit 102 and the removable unit 104. According to embodiments, the diverter interface 110 is a three position rotary lever diverter, as in FIG. 14, where a first position of the lever allows fluid to flow from the fluid supply FS to the fixed unit 102 only, where a second position of the lever allows fluid to flow from the fluid supply FS to the removable unit 104 only, and where a third position of the lever allows fluid to flow from the fluid supply FS to both the fixed unit 102 and the removable unit 104.

Figure 15D:
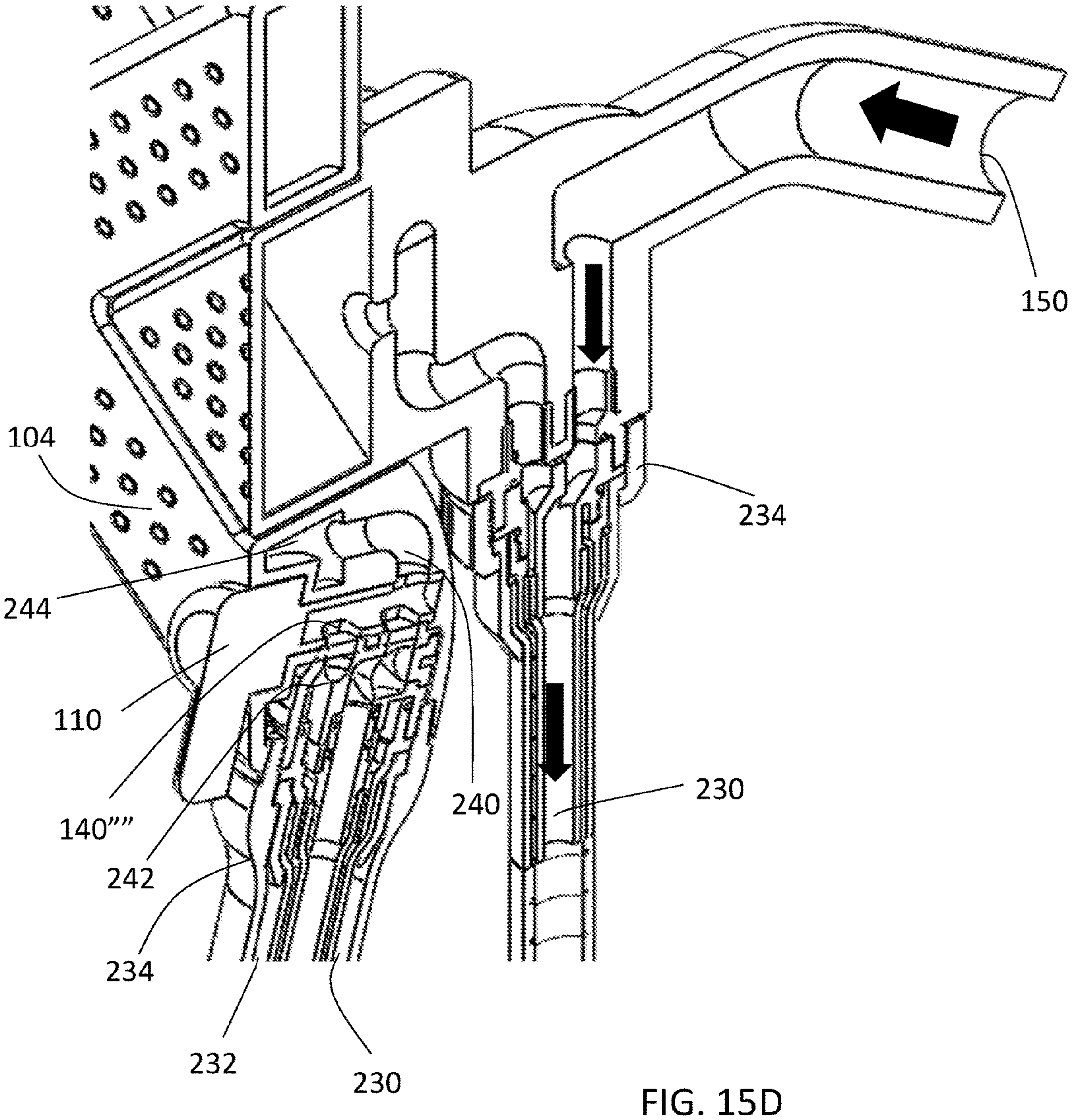
FIG. 15D is a detailed view of the cross-sectional view of FIG. 15C.
Figure 16A:
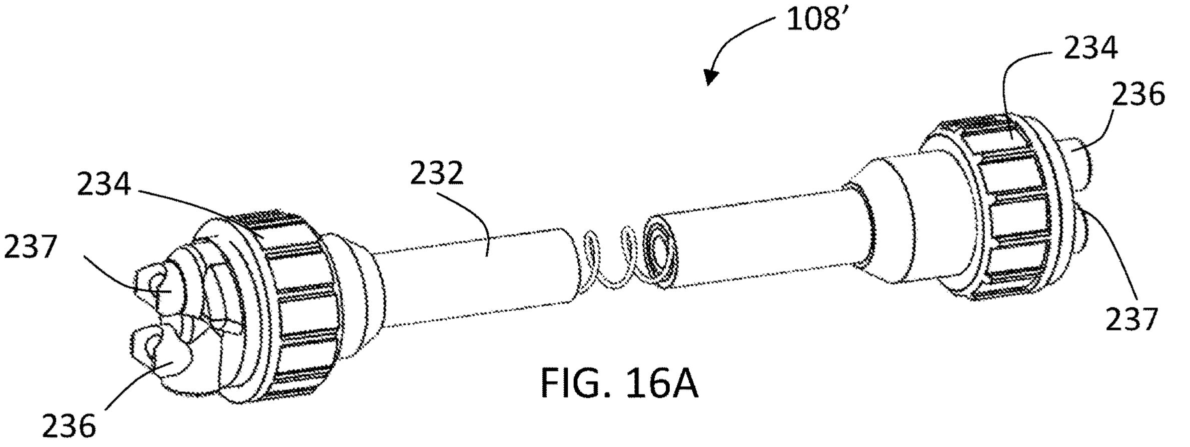
FIG. 16A is a perspective view of a dual channel hose according to embodiments of the present disclosure.
Figure 16B:
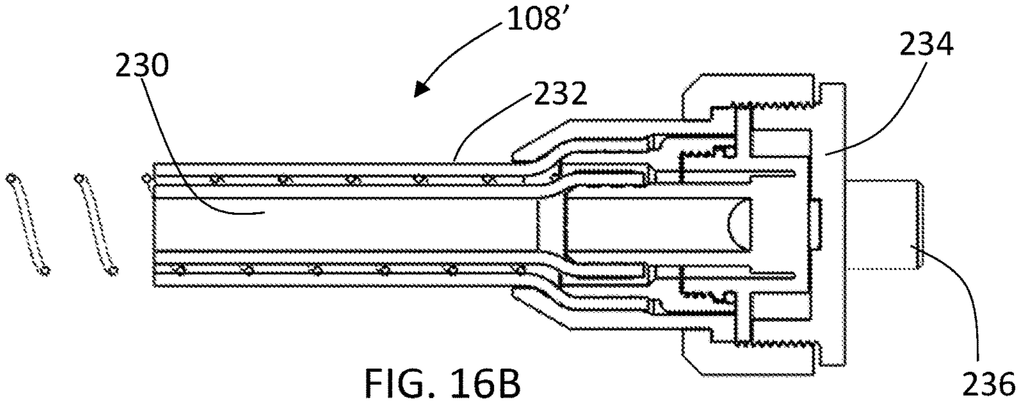
FIG. 16B is a cross-sectional view of an end of the dual channel hose of FIG. 16A.
Figure 17A:
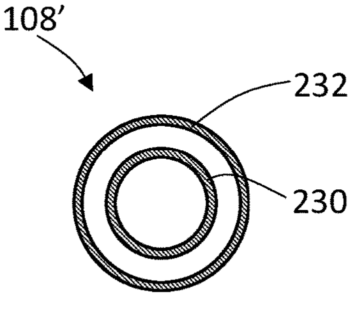
FIGS. 17A-17C are cross-sectional view of a dual channel hose according to embodiments of the present disclosure.
Figure 17B:
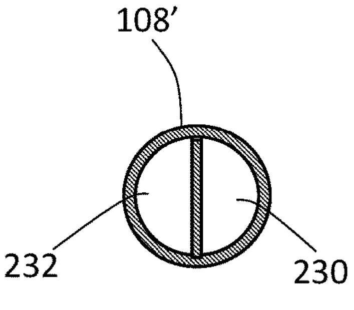
Figure 17C:
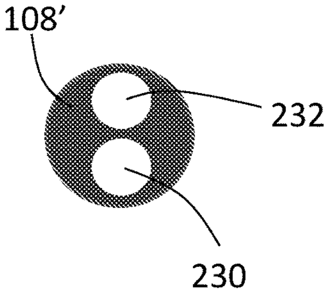

According to embodiments in which the fluid diverter 140'''' is integral with the removable fluid dispensing unit 104, the hose 108 is a dual channel hose 108' as shown in FIGS. 16A-16B. The dual channel hose 108' includes a first conduit 230 and a second conduit 232, which may be positioned within one another (as in FIG. 17A) or along one another (as in FIGS. 17B and 17C). As shown in FIG. 16B, the hose 108' includes a first conduit 230 positioned within a second conduit 232. The hose 108' includes a connector 234 that receives water from the fluid supply FS and directs the supplied fluid to the first and second conduits 230, 232. As shown in FIG. 15D, fluid from the fluid supply FS, enters the first conduit 230 via one opening 236 in the connector 234. The fluid in the first conduit 230 is supplied to the diverter 140' integral with the removable fluid dispensing unit 104. Rotation of the rotatable lever diverter interface 110 or movement of the three position pin or button diverter interface 110 causes openings 238 in the diverter 140' to selectively align with channels 240, 242 in a diverter housing 244. A first of these channels 240 configured to supply fluid from the diverter 140' to the nozzles 126 of the removable fluid dispensing unit 104 and the second of these channels 242 configured to supply fluid from the diverter 140' to the nozzles 112 of the fixed fluid dispensing unit 102, via the second conduit 232 of the hose 108' and a second opening 237 in the connector 234. Thus, each rotation of the rotatable lever diverter interface 110 or three position pin or button diverter interface 110 diverts the fluid from the fluid supply FS via the hose 108' to flow from one chamber to the other. Based on the alignment of the outlets 138 with channels 240, 242, the diverter 140'''' directs fluid to the removable shower head 104, back through the hose 108' to the fixed shower head 102, or both, as shown by the arrows in FIG. 15D.

The foregoing description is illustrative of particular embodiments of the invention, but is not meant to be a limitation upon the practice thereof. The following claims, including all equivalents thereof, are intended to define the scope of the invention.

The invention claimed is:

1. A showerhead with a removable portion comprising:

a fixed fluid dispensing unit supported at a location, said fixed dispensing unit having a plurality of fixed nozzle apertures arranged on a fixed spray face within a first area of between 55 and 95 percent of the fixed spray face, the fixed spray face having a second area devoid of fixed nozzle apertures and contiguous and integral with the first area;

a removable fluid dispensing unit having a front face defining a front face area, a back surface in opposition to the front face, and a plurality of removable nozzle apertures arranged on the front face, the back surface adapted to overlap the second area of the fixed spray face and protrude completely from the fixed spray face;

a handle extending from said removable fluid dispensing unit; and a hose in fluid communication with a fluid supply adapted to being in selective communication with at least one of said fixed and said removable fluid dispensing unit via a front mounted diverter interface; and wherein the front mounted diverter interface that extends from said removable fluid dispensing unit, the front mounted diverter interface configured to actuate a fluid diverter that is integral with said handle that extends from said removable fluid dispensing unit of that is integral with said fixed fluid dispensing unit.

2. The showerhead of claim 1 wherein said fixed fluid dispensing unit and said removable fluid dispensing unit when wall mounted and overlapping define a vertical plane of symmetry therethrough.

3. The showerhead of claim 1 wherein said fixed fluid dispensing unit and said removable fluid dispensing unit when wall mounted and overlapping define a horizontal plane of symmetry therethrough.

4. The showerhead of claim 2 wherein said fixed fluid dispensing unit and said removable fluid dispensing unit when wall mounted and overlapping define a three-fold axis of symmetry therethrough.

5. The showerhead of claim 1 wherein the second area of the fixed spray face is positioned within a lower half of the fixed spray face of said fixed fluid dispensing unit.

6. The showerhead of claim 1 wherein the second area of the fixed spray face is positioned in a central region of the fixed spray face of said fixed fluid dispensing unit.

7. The showerhead of claim 1 wherein said hose is connected between said fixed fluid dispensing unit and said handle extending from said removable fluid dispensing unit.

8. The showerhead of claim 1 wherein the front mounted diverter interface protrudes from the fixed spray face of said fixed fluid dispensing unit, the front mounted diverter interface configured to actuate a fluid diverter that is integral with said fixed fluid dispensing unit.

9. A showerhead with a removable portion comprising:

a fixed fluid dispensing unit supported at a location, said fixed dispensing unit having a plurality of fixed nozzle apertures arranged on a fixed spray face within a first area of between 55 and 95 percent of the fixed spray face, the fixed spray face having a second area devoid of fixed nozzle apertures and contiguous and integral with the first area;

a removable fluid dispensing unit having a front face defining a front face area, a back surface in opposition to the front face, and a plurality of removable nozzle apertures arranged on the front face, the back surface adapted to overlap the second area of the fixed spray face and protrude completely from the fixed spray face;

a handle extending from said removable fluid dispensing unit;

a hose in fluid communication with a fluid supply adapted to being in selective communication with at least one of said fixed and said removable fluid dispensing unit via a front mounted diverter interface; and wherein said removable fluid dispensing unit defines a through hole that extends between the front face and the opposing back surface, the through hole adapted to surround the front mounted diverter interface.

10. The showerhead of claim 1 wherein said hose is a dual channel hose.

11. The showerhead of claim 1 wherein the front mounted diverter interface is selected from a group consisting of a rotatable knob, a rotatable lever, a push button, and a rocker button.

12. The showerhead of claim 1 wherein the fixed fluid dispensing unit is supported at the location by a ball joint.

13. The showerhead of claim 1 further comprising at least one magnet disposed within one of said fixed fluid dispensing unit and said removable fluid dispending unit, said at least one magnet configured to removably attach said removable fluid dispending unit to said fixed fluid dispensing unit.

14. The showerhead of claim 13 wherein said at least on magnet is disposed within the second area of the fixed spray face of said fixed fluid dispensing unit.

15. The showerhead of claim 13 further comprising a magnet release button positioned on said handle that extends from said removable fluid dispensing unit, said magnet release button configured to disengage said at least one magnet to detach said removable fluid dispending unit from said fixed fluid dispensing unit.

16. A showerhead with a removable portion comprising:

a fixed fluid dispensing unit supported at a location, said fixed dispensing unit having a plurality of fixed nozzle apertures arranged on a fixed spray face within a first area of between 55 and 95 percent of the fixed spray face, the fixed spray face having a second area devoid of fixed nozzle apertures and contiguous and integral with the first area;

a removable fluid dispensing unit having a front face defining a front face area, a back surface in opposition to the front face, and a plurality of removable nozzle apertures arranged on the front face, the back surface adapted to overlap the second area of the fixed spray face and protrude completely from the fixed spray face;

a handle extending from said removable fluid dispensing unit;

a hose in fluid communication with a fluid supply adapted to being in selective communication with at least one of said fixed and said removable fluid dispensing unit via a front mounted diverter interface; and wherein said fixed fluid dispensing unit has a shape that is the same as a shape of said removable fluid dispensing unit.

17. The showerhead of claim 1 wherein the fixed spray face of said fixed fluid dispensing unit has an overall surface area that is greater than or equal to the front face area of said removable fluid dispensing unit.

18. The showerhead of claim 1 wherein the plurality of fixed nozzle apertures are uniformly sized and uniformly arranged to cover the first area of the fixed spray face of said fixed fluid dispensing unit.

19. The showerhead of claim 1 wherein the plurality of removable nozzle apertures are uniformly sized and uniformly arranged to cover the front face area of the front face of said removable fluid dispensing unit.

* * * * *